(12) United States Patent
Wang et al.

(10) Patent No.: US 11,805,570 B2
(45) Date of Patent: Oct. 31, 2023

(54) ALIGNMENT OF DISCONTINUOUS RECEPTION (DRX) ACTIVE TIMES ACROSS UU AND SIDELINK INTERFACES

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Qing Li, Princeton Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 17/506,450

(22) Filed: Oct. 20, 2021

(65) Prior Publication Data

US 2023/0122562 A1    Apr. 20, 2023

(51) Int. Cl.
*H04W 76/28* (2018.01)
*H04W 72/10* (2009.01)
*H04W 72/23* (2023.01)
*H04W 92/18* (2009.01)

(52) U.S. Cl.
CPC ........... *H04W 76/28* (2018.02); *H04W 72/23* (2023.01); *H04W 92/18* (2013.01)

(58) Field of Classification Search
CPC .............................. H04W 76/28; H04W 72/23
See application file for complete search history.

(56) References Cited

U.S. PATENT DOCUMENTS

2022/0330147 A1* 10/2022 Sarkis ................ H04W 56/001

* cited by examiner

*Primary Examiner* — Ronald B Abelson
(74) *Attorney, Agent, or Firm* — Danai Nelisile Mhembere; ArentFox Schiff LLP

(57) ABSTRACT

For each UE (TxUE) in discontinuous reception (DRX) in sidelink (SL) with each second UE(RxUE), and in communication over an air interface (Uu) with a gNB, determining a TxUE Uu active time. Further determining a TxUE Uu offset time accounting for TxUE processing of both a TxUE SL grant from the gNB and data for SL transmission to each RxUE. The TxUE Uu offset time is greater than or equal to a minimum TxUE Uu offset time. Further determining, for each RxUE, one or more RxUE SL active times, each RxUE SL active time: starting no earlier than a start of the TxUE Uu active time plus the TxUE Uu offset time for a TxUE from which the each RxUE is to receive data, and ending no later than the end of the TxUE Uu active time for a TxUE from which the each RxUE is to receive data.

30 Claims, 16 Drawing Sheets

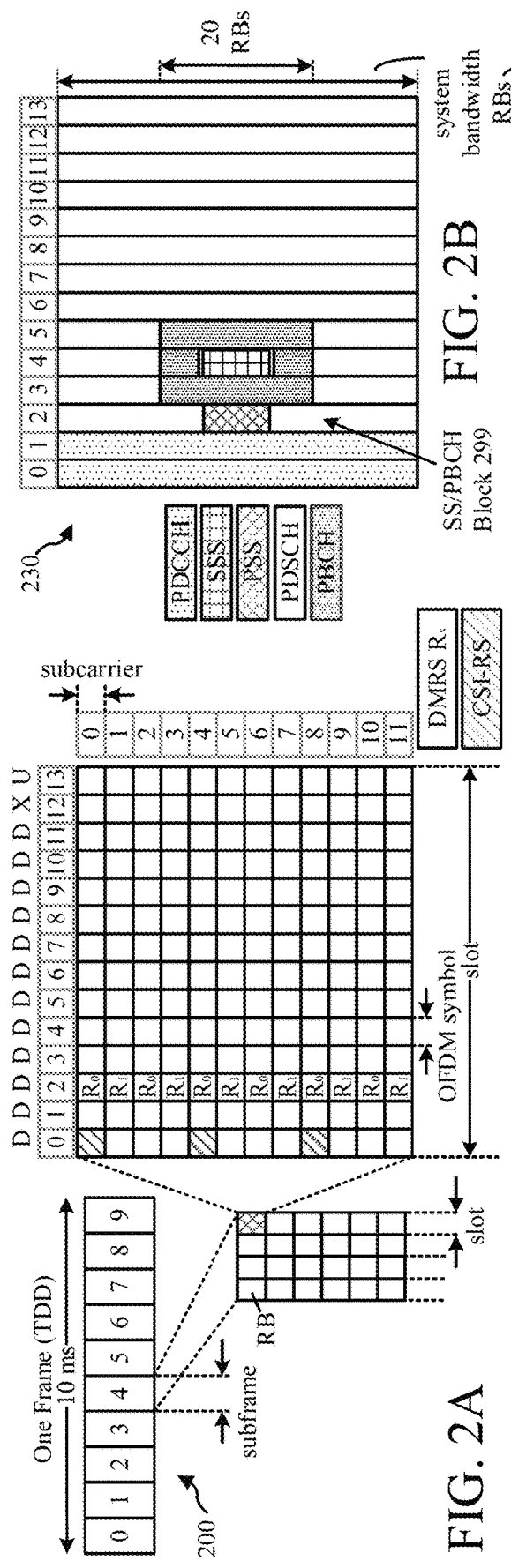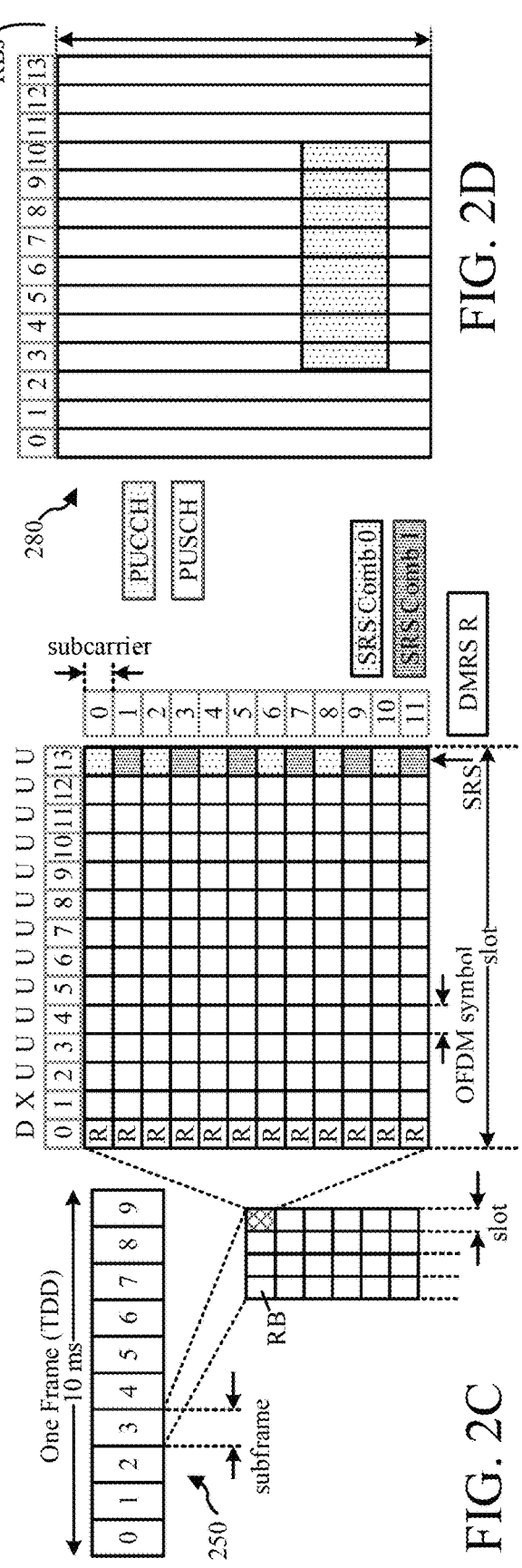

700

Receiving, prior to each determining, from the corresponding TxUE by the corresponding gNB at least one of i) the path loss in SL between each RxUE and the corresponding TxUE, and 2) the traffic pattern as list of {periodicity, packet size} for each of one or more data flows. - 750

For each of one or more first UEs (TxUEs) i) in a first discontinuous reception (DRX) mode in sidelink (SL) with each of one or more second UEs (RxUEs), and ii) in a second DRX mode over an air interface (Uu) with a corresponding gNB, determining: an TxUE Uu active time, and a TxUE Uu offset time accounting for processing, by the TxUE, of both i) an SL resource grant of the TxUE from the gNB over Uu and ii) data for transmission to each RxUE over the granted SL resources, the TxUE Uu offset time greater than or equal to a minimum TxUE Uu offset time characteristic of the TxUE. - 510

Determining, for each RxUE, one or more RxUE SL active times, each RxUE SL active time: starting no earlier than a start of the TxUE Uu active time plus the TxUE Uu offset time for a TxUE from which the each RxUE is to receive data, and ending no later than the end of the TxUE Uu active time for a TxUE from which the each RxUE is to receive data over SL. - 520

ALIGNMENT OF DISCONTINUOUS RECEPTION (DRX) ACTIVE TIMES ACROSS UU AND SIDELINK INTERFACES

TECHNICAL FIELD

The present disclosure relates generally to communication systems, and more particularly in some examples, to aligning discontinuous reception (DRX) active times across Uu and sidelink (SL) interfaces of multiple user equipment (UEs) in SL communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The technology disclosed herein includes method, apparatus, and computer-readable media including instructions for wireless communication. In such technology, for each of one or more UEs (TxUEs) in discontinuous reception (DRX) in sidelink (SL) with each one or more second UEs (RxUEs), and in communication over an air interface (Uu) with a base station, for example a next-generation NodeB or giga-NodeB (either of which may be referred to as a gNB), a TxUE Uu DRX active time is determined. Further a TxUE Uu DRX offset time is determined accounting for TxUE processing of both a TxUE SL grant from the gNB and data for SL transmission to each RxUE. The TxUE Uu DRX offset time is greater than or equal to a minimum TxUE Uu DRX offset time. Further, for each RxUE, one or more RxUE SL active times is determined. Each RxUE SL active time starts no earlier than a start of the TxUE Uu DRX active time plus the TxUE Uu DRX offset time for a TxUE from which the each RxUE is to receive data. Each RxUE SL active time ends no later than the end of the TxUE Uu DRX active time for a TxUE from which the each RxUE is to receive data To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A, FIG. 2B, FIG. 2C, and FIG. 2D are diagrams illustrating examples of a first 5G/NR frame, DL channels within a 5G/NR subframe, a second 5G/NR frame, and UL channels within a 5G/NR subframe, respectively.

FIG. 7 is a flowchart of methods of wireless communication is shown, in accordance with examples of the technology disclosed herein.

DETAILED DESCRIPTION

Figure 1:
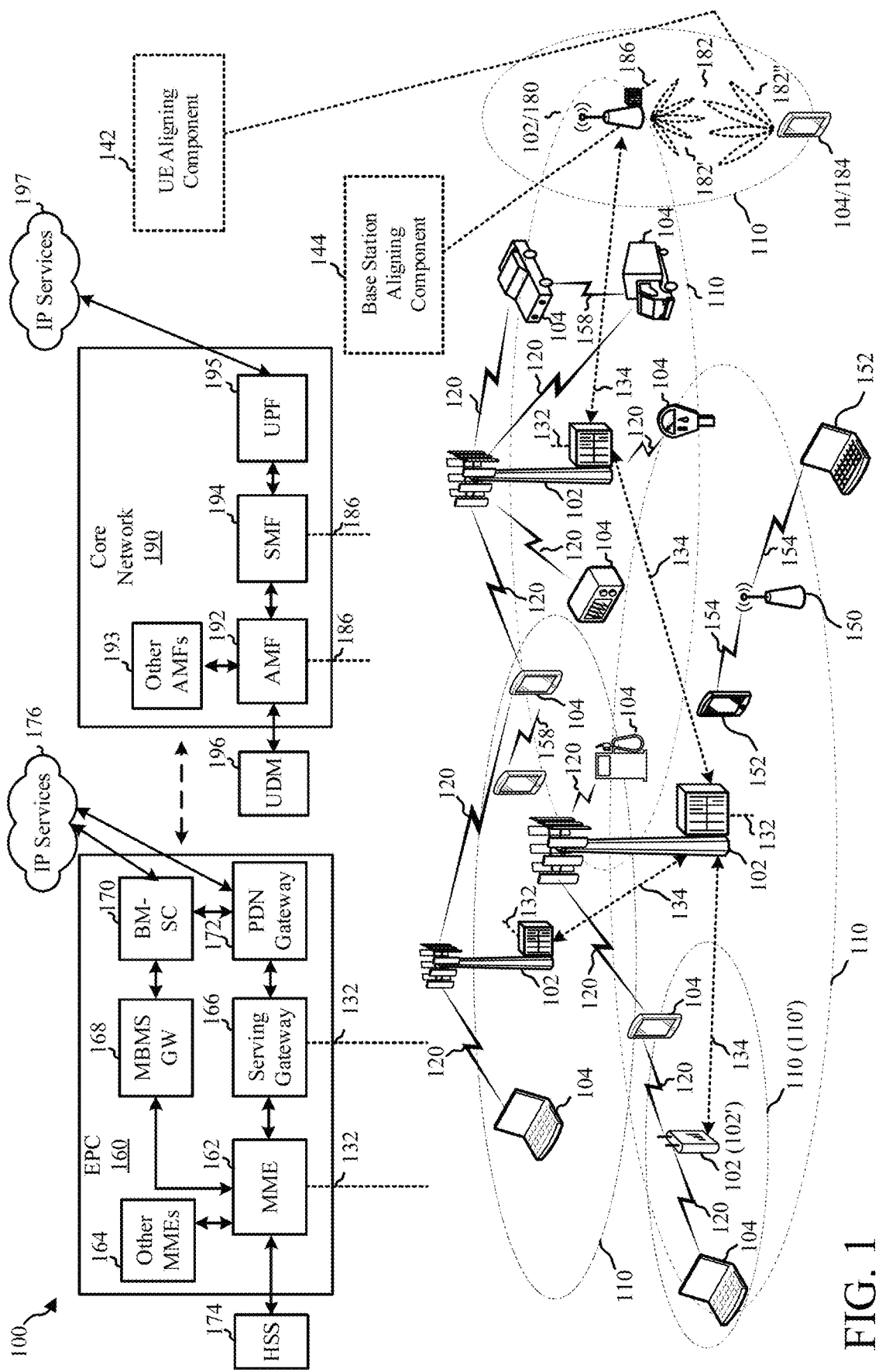
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

In 5G NR, certain user equipment (UE), such as mobile phones or 5G-enabled Internet of Things (IoT) devices, can communicate directly with each other using device-to-device (D2D) communication link. The D2D communication link may use the DL/UL WWAN spectrum (describe further elsewhere herein). The D2D communication link may use one or more sidelink (SL) channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or 5G NR. In 5G NR the SL air interface is also known as "PC5," while the air interface between the UE and the network (e.g., through a next-generation NodeB or giga-NodeB (either of which may be referred to as a gNB)) is referred to as the "Uu" air interface. In one mode of D2D communication, one or more of the UEs in D2D communication in SL/PC5 can be connected over the Uu air interface to a gNB.

A UE may operate in connected mode discontinuous reception (C-DRX). In C-DRX, the UE may operate in repeated cycles of wake up period (on duration or active time) and sleep period (inactive time). In Uu (network communication with a base station (BS)), the UE may monitor for control signals (such as downlink control information (DCI)) from a serving BS (e.g., a gNB) during the wake up period. The UE may turn off radio frequency (RF) components during the sleep period to save power, when the UE does not monitor for DCIs during the sleep period. The BS may configure the UE with DRX and knows when the UE is in the active states for monitoring for DCI. If a DCI is received from the BS, the UE may perform actions related to the received DCI, and return to the sleep period until the next wakeup period.

A UE implementing SL communication with another UE may also operate in C-DRX mode with the other UE. SL DRX (DRX for sidelink communication) configuration may be configured per unicast connection, e.g., per a pair of source and destination identifier (ID). For unicast, the UE may adopt per-direction DRX configuration as baseline. For SL DRX configuration of each direction where one UE (e.g., the transmitting UE (TxUE)) is communicating with the other UE (e.g., the receiving UE (RxUE)), the support signaling exchange may include both i) Signaling-1: signaling from RxUE to TxUE, and ii) Signaling-2: signaling from TxUE to RxUE. In some aspects, for DRX configuration of each direction where one UE is the TxUE and the other UE is the RxUE, signaling-1 (RX to TX) may be carried via a PC5-RRC message from RxUE to TxUE. Signaling-2 (TX to RX) may be carried via signals, such as RRCReconfigurationSidelink, to deliver the SL DRX configuration from TxUE to RxUE. For SL unicast, TxUE centric DRX configuration may be based on the assistance information from the RxUE. TxUE centric DRX configuration means that the TxUE configures the RxUE's SL DRX (i.e., TxUE tells RxUE when to be awake and monitor for sidelink control information (SCI) from the TxUE (active mode), and when to sleep (inactive mode). An inactive state may mean that the RxUE is reducing or shutting down RF components to conserve power.

For SL DRX configuration of each direction where one UE is the TxUE and the other UE is the RxUE, when TxUE is in-coverage and/or in RRC_CONNECTED state, the TxUE may report the information received in signaling-1 (RxUE to TxUE) to its serving base station (a gNB). In some aspects, when the TxUE is in-coverage and/or in RRC_CONNECTED state, the TxUE may obtain information related to SL DRX configuration of the RxUE from one or more dedicated RRC messages from it serving gNB to generate signaling-2 (TxUE to RxUE). In another aspect, when the RxUE is in-coverage and/or in RRC_CONNECTED state, the RxUE may report the SL DRX configuration received in signaling-2 (TX to RX) to its own serving gNB.

It would be beneficial to align the TxUE's Uu DRX and RxUE's SL DRX, e.g., to ensure that the SL grant scheduled for the TxUE during its Uu DRX active time falls into the SL DRX active time of the peer RxUE.

In aspects of the present disclosure, methods, non-transitory computer readable media, and apparatuses are provided. In some examples of the technology disclosed herein, for each of one or more first UEs (TxUEs) i) in a first discontinuous reception (DRX) mode insidelink (SL) with each of one or more second UEs (RxUEs), and ii) in a second DRX mode over an air interface (Uu) with a corresponding gNB, determine a TxUE Uu active time, and a TxUE Uu offset time accounting for processing, by the TxUE, of both i) an SL resource grant of the TxUE from the gNB over Uu and ii) data for transmission to each RxUE over the granted SL resources. The TxUE Uu offset time is greater than or equal to a minimum TxUE Uu offset time of the TxUE. The example second determines, for each RxUE, one or more RxUE SL active times, each RxUE SL active time: starting no earlier than a start of the TxUEUu active time plus the TxUE Uu offset time for a TxUE from which the each RxUE is to receive data, and ending no later than the end of the TxUE Uu active time for a TxUE from which the each RxUE is to receive data over SL. Some such examples further include transmitting, by each TxUE to each of the corresponding one or more RxUEs via SL, each RxUE SL active time; and communicating, via SL, from each TxUE to each corresponding RxUE in accordance with the TxUE Uu active time and the transmitted active times.

In some examples each TxUE Uu active time comprises a TxUE Uu active time start and a TxUE Uu active time duration (TxUE onDuration); each RxUE SL active time comprises an RxUE active time start and RxUE active time duration (RxUE onDuration); and each RxUE onDuration is a function of one or more of: path loss in SL between the each RxUE and the corresponding TxUE; a traffic pattern between the each RxUE and the corresponding TxUE in SL; a number of RxUEs connected in SL to the corresponding TxUE; and a quality of service required between the each-RxUE and the corresponding TxUE in SL. In some such examples, each determining is performed in the gNB corresponding to the corresponding TxUE; and the example further includes receiving, prior to each determining, from the corresponding TxUE by the corresponding gNB at least one of i) the path loss in SL between each RxUE and the corresponding TxUE, and ii) the traffic pattern as list of {periodicity, packet size} for each of one or more data flows. In other such examples, a particular TxUE of the one or more TxUEs is not capable of communicating in SL with a plurality of RxUEs having overlapping RxUE SL active times; and determining, for each RxUE, one or more RxUE SL active times corresponding to the particular TxUE further includes determining one or more RxUE SL active times that do not overlap with active times of another RxUE in SL communication with the particular TxUE. In other such examples, a particular RxUE of the one or more RxUEs is not capable of receiving signals from multiple TxUEs at a same time; and determining a TxUEactive time includes determining a TxUE active time that does not overlap with an active time of another TxUE in SL communication with the particular RxUE. Other such examples, further include second receiving, from each RxUE by the corresponding TxUE and prior to determining one or more RxUE SL active times, an indication of an ability of the each RxUE to monitor signals from multiple UEs (numTxUEsmonitor). In those examples, RxUEonDuration further comprises a function of the received numTxUEsmonitor.

In some such examples, each determining is performed in the gNB corresponding to the corresponding TxUE; and the method further includes third receiving, from the corresponding TxUE by the corresponding gNB the transmitted numTxUEsmonitor as part of a SidelinkURInformationNR message prior to determining a TxUE active time. In other such examples, a particular TxUE of the one or more TxUEs is capable of communicating in SL with a plurality of RxUEs having overlapping RxUE SL active times, and each determining is performed in the gNB corresponding to the TxUE Further, the method includes fourth receiving, from the TxUE to the corresponding gNB and prior to the determining one or more the RxUE SL active times, an indication of the capability of the particular TxUE of communicating in SL with a plurality of RxUEs having overlapping RxUE SL active times (fastBeamSwitch). In such methods, determining, for each RxUE, one or more RxUE SL active times corresponding to the particular TxUE further includes determining one or more RxUE SL active times that overlap with active times of another RxUE in SL communication with the particular TxUE only if fastBeamSwitch is indicated for the particular TxUE. In some examples, the fourth receiving comprises fourth receiving the fastBeamSwitch using a Radio Resource Control (RRC) information element (IE) UE-NR-Capability as a physical parameter specific to Frequency Range 2 (FR2)—where "UE-NR" stands for "User Equipment—New Radio."

In some such examples, each determining is performed in the gNB corresponding to the TxUE. Such examples further include fifth receiving, from the TxUE by the corresponding gNB and prior to the determining one or more the RxUE SL active times, the minimum TxUE Uu offset time (onDuration-Offset) of the TxUE. In some such examples, the fifth receiving comprises fifth receiving the onDuration-Offset using a Radio Resource Control (RRC) information element (IE) UE-NR-Capability as a physical parameter common to Frequency Range 1 (FR1) and Frequency Range 2 (FR2).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store processor-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN))

may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links (132, 186, 134) may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. In some examples of the technology disclosed herein, both the DL and the UL between the base station and a UE use the same set of multiple beams to transmit/receive physical channels. For example, a given set of beams can carry the multiple copies of a Physical Downlink Shared Channel (PDSCH) on the DL and can carry multiple copies of a Physical Uplink Control Channel (PUCCH) on the UL.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR. The wireless communications system may further include a Wi-Fi access point (AP) in communication with Wi-Fi stations (STAs) 152 via communication links 154 in a 5 GHz unlicensed frequency spectrum. When communicating in an unlicensed frequency spectrum, the STAs 152/AP may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in one or more frequency bands within the electromagnetic spectrum. The base station 180 and the UE 104 may each include a plurality of antennas, such as antenna elements, antenna panels, and/or antenna arrays to facilitate the beamforming.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming with the UE 104/184 to compensate for the path loss and short range using beams 182.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smartphone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Continuing to refer to FIG. 1, in certain aspects, the technology disclosed herein is method of wireless communication, in which for each of one or more first UEs 104a (TxUEs 104a) i) in a first discontinuous reception (DRX) mode in sidelink (SL) with each of one or more second UEs 350b (RxUEs 350b), and ii) in a second DRX mode over an air interface (Uu) with a corresponding gNB, determine a TxUE 350a Uu active time, and a TxUE 350a Uuoffset time accounting for processing, by the TxUE 350a, of both i) an SL resource grant of the TxUE 350a from the gNB over Uu and ii) data for transmission to each RxUE over the granted SL resources. The TxUE Uu 350a offset time is greater than or equal to a minimum TxUE 350a Uu offset time of the TxUE 350a. The example second determines, for each RxUE, one or more RxUE SL active times, each RxUE SL active time: starting no earlier than a start of the TxUE 350a Uu active time plus the TxUE 350a Uu offset time for a TxUE 350a from which the each RxUE is to receive data, and ending no later than the end of the TxUE 350a Uu active time for a TxUE 350a from which the each RxUE is to receive data over SL. Such methods can be performed by one or more of the UE 350 and base station 310 components, including UE aligning component 142 and bas station aligning component 144.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS maybe transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative ACK (NACK) feedback. The PUSCH carries data and may additionally be used to carry a buffer status report (BSR), a power headroom report (PHR), and/or UCI.

Figure 3:
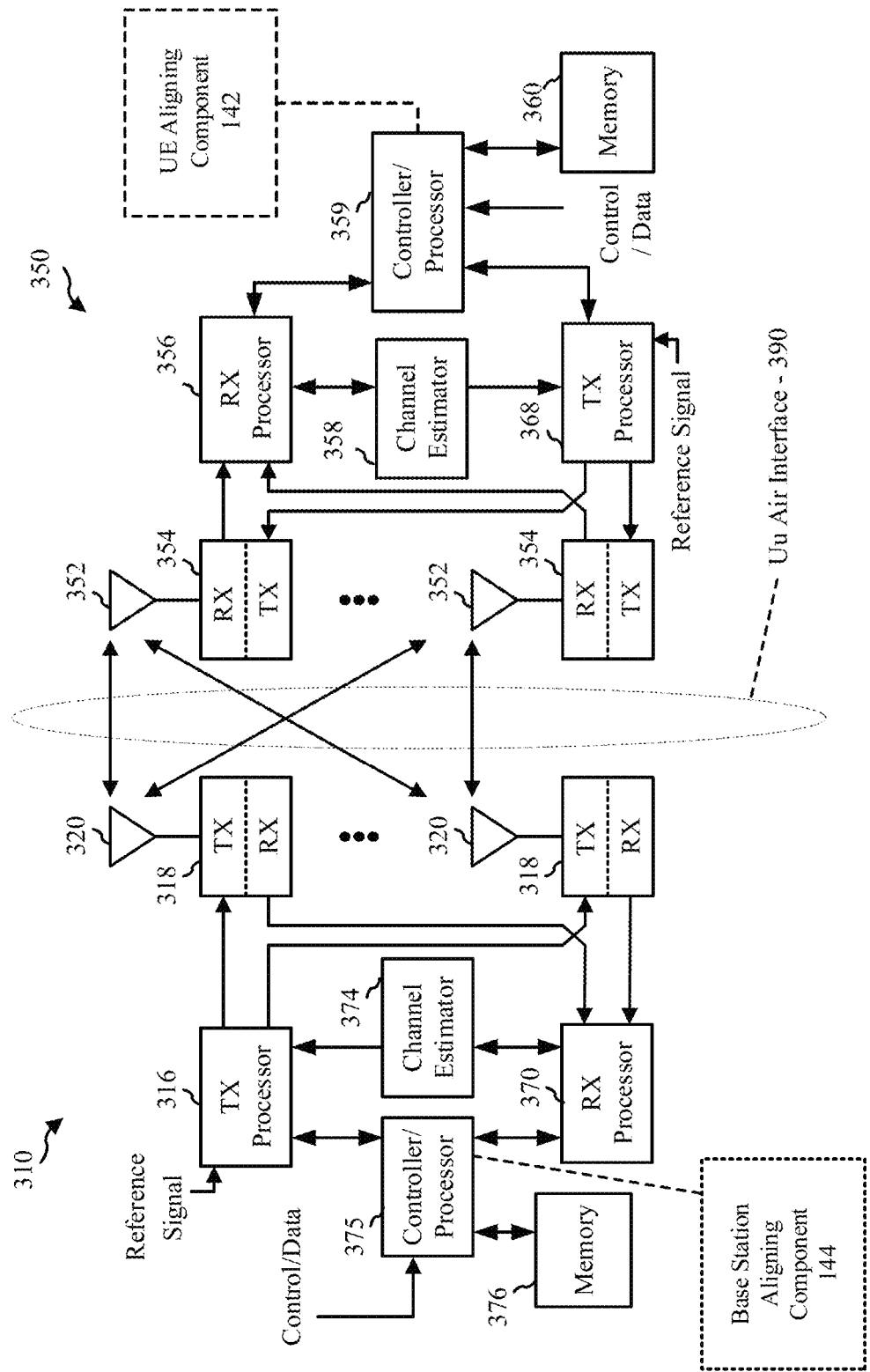
FIG. 3 is a diagram illustrating a base station and user equipment (UE) in an access network, in accordance with examples of the technology disclosed herein.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. As described elsewhere herein, the interface between a UE 350 and a base station 310 can be referred to as a "Uu" interface 390.

Continuing to refer to FIG. 3, and continuing to refer to prior figures for context, in certain aspects, the technology disclosed herein is method of wireless communication, in which for each of one or more first UEs 350a (TxUEs 350a) i) in a first discontinuous reception (DRX)mode in sidelink (SL) with each of one or more second UEs 350b (RxUEs 350b), and ii) in a second DRX mode over an air interface (Uu) with a corresponding gNB, determine a TxUE 350a Uu active time, and a TxUE 350a Uu offset time accounting for processing, by the TxUE 350a, of both i) an SL resource grant of the TxUE 350a from the gNB over Uu and ii) data for transmission to each RxUE over the granted SL resources. The TxUE Uu 350a offset time is greater than or equal to a minimum TxUE 350a Uu offset time of the TxUE 350a. The example second determines, for each RxUE, one or more RxUE SL active times, each RxUE SL active time: starting no earlier than a start of the TxUE 350a Uu active time plus the TxUE 350a Uu offset time for a TxUE 350a from which the each RxUE is to receive data, and ending no later than the end of the TxUE 350a Uu active time for a TxUE 350a from which the each RxUE is to receive data over SL. Such methods can be performed by one or more of the UE 350 and base station 310 components, including UE aligning component 142 and bas station aligning component 144.

Figure 4:
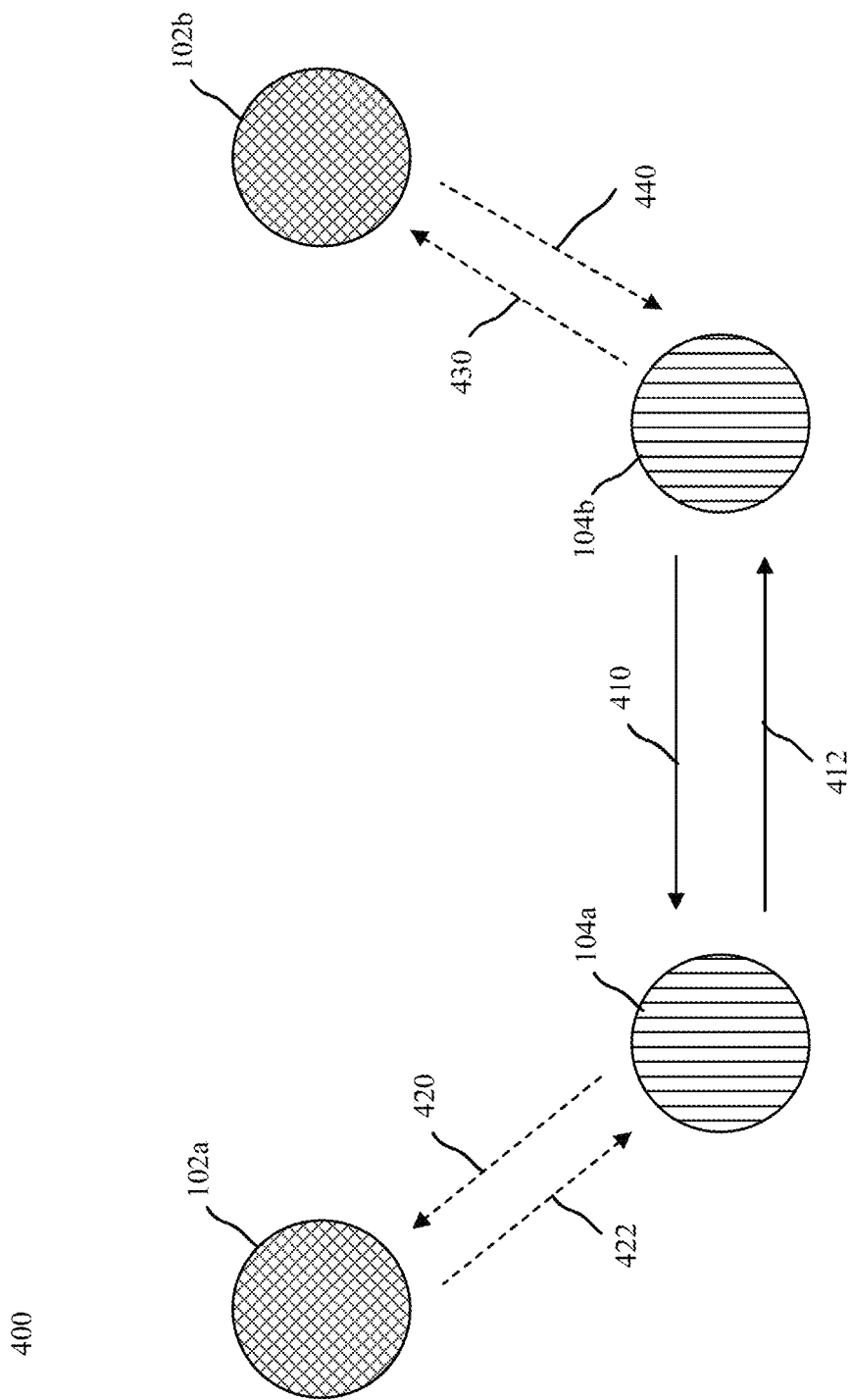
FIG. 4 is a diagram illustrating message flow between UEs and their respective base stations in Uu and SL DRX, in accordance with examples of the technology disclosed herein.

FIG. 4 illustrates an example of an environment for communicating DRX configurations. In one aspect, the environment 400 includes a first BS 102a, a second BS 102b, a TxUE 104a, and a RxUE 104b. In one example, the first BS 102a and the second BS 102b may each be a gNB. For the TxUE centric DRX configuration scheme, the RxUE 104b may transmit a first message 410 (e.g., signaling-1) via a SL connection to the TxUE 104a. The first message 410 may be used by the TxUE 104a (or the gNB 102a corresponding to the TxUE 104a) to determine the configuration for the SL DRX between the RxUE 104b and the TxUE 104a. The first message 410 may include DRX configurations, preferences, and/or priority information of one or more connections between the RxUE 104b and other devices, such as the second BS 102b. The first message 410 may include DRX parameters such as the cycle duration and start offset (e.g., drx-LongCycleStartOffset), the slot offset (e.g., drx-SlotOffset), the on duration length (e.g., drx-OnDurationTimer), the inactivity timer duration (e.g., drx-InactivityTimer), and/or the maximum duration of active timer for each of the one or more connections. The first message 410 may include preferences of the RxUE 104b. For example, the RxUE 104b may be able to receive from two SL TxUEs 104a using a Rx beam. It may be more efficient to have the on durations corresponding to the two SL TxUEs overlap in time partially, substantially, or completely. If the RxUE 104b has an existing SL DRX configured with one of the two SL TxUEs 104a, the RxUE 104b may indicate to the TxUE 104a the preference to align the SL DRX with the other SL DRX of the other SL TxUE 104a. The first message 410 may include an indication of priority among the SL DRX and one or more SL DRX with one or more SL UEs (not shown). The first message 410 may include an indication of priority among the DRX and one or more receptions from the TxUE 104a.

Alternatively or additionally, in some aspects, the first message 410 may include the RF capabilities of the RxUE 104b, including the number of antennas or antenna arrays, the number of RX beams and/or TX beams the RxUE 104b is able to support at a given time (e.g., the number of contemporaneous transmissions and/or receptions), the number of RX beams and/or TX beams already allocated for DRX, angular separations between the beams already allocated and beams to be allocated for DRX with the TxUE 104a, and/or power leakage from the beams already allocated to the beams to be allocated for DRX with the TxUE 104a.

In response to receiving the first message 410, the TxUE 104a may transmit a second message 412 (e.g., signaling-2) to the RxUE 104b. The second message 412 may include a current SL DRX configuration for the SL communication between the TxUE 104a and the RxUE 104b. The current DRX configuration may include one or more of the current cycle duration and start offset value, the current slot offset value, the current on duration length value, the current inactivity timer duration value, or the current maximum duration of active timer value. The RxUE 104b monitors for control signals from the TxUE 104a during wake up cycles and saves power during sleep cycles; wake up and sleep cycles are determined based on the second message 412.

In some instances, during a radio resource control (RRC) connected state, the TxUE 104a may transmit at least some information in the first message 410 to the first BS 102a in a third message 420. Based on the third message 420 in Uu, the first BS 102a may respond in Uu with a fourth message 422. The fourth message 422 may include SL DRX configuration information for the SL DRX between the TxUE 104a and the RxUE 104b. The TxUE 104a may generate the second message 412 based on the information in the fourth message 422. In some instance, the RxUE 104b may report the SL DRX configuration for the SL DRX to the second BS 102b in Uu (e.g., message 430) and receive an updated RxUE 104b configuration for communication in Uu with the BS 102b (e.g., message 440).

In some instances, where an RxUE 104b is RRC connected to its gNB 102b, the Uu DRX for the RxUE 104b connection is timer-based C-DRX. If the RxUE 104b is in RRC inactive/idle mode with its gNB 102b, then the Uu DRX is paging-based I-DRX. If a TxUE 104a is RRC connected with its gNB 102a, then the Uu DRX is timer-based C-DRX. If a TxUE 104a is in RRC inactive/idle mode with its gNB 102a, the TxUE receives no SL grant from gNB, and works in mode 2.

It takes some time for the TxUE 104a to process the SL grant and data from gNB 102a before transmitting to RxUE 104b. The RxUE 104b does not need to monitor the SL channel when the TxUE 104a is processing the SL grant and data. In aspects of the technology disclosed herein, there is an offset between the start of the TxUE 104a active times on Uu and the start of the RxUE 104b active times on SL. An onDuration-Offset can be the minimum value of the offset. The start of the RxUE 104b active time may be later than onDuration-Offset. The length of the onDuration-Offset depends on TxUE 104*a* capability, e.g., how long it takes to process the SL grant and data.

The RxUE 104*b* active time can be shorter than TxUE 104*a* active time, e.g., according to a function or heuristic. For example, RxUE onDuration=α*TxUE onDuration (0<α≤1). Either the TxUE 104*a* or the TxUE 104*a* gNB 102*a* can determine RxUE onDuration based on factors such as path loss of the SL, traffic pattern on the SL, the number of RxUEs that TxUE 104*a* connects to (and vice versa), and QoS required in SL. Regarding the path loss in SL, for a small path loss, the TxUE 104*a* (or the gNB 102*a*) can select high data rate, so that onDuration may be smaller; otherwise, onDuration should be larger. Regarding the number of connections, if there are a plurality of RxUEs 104*b* connected to the same TxUE 104*a*, then the active time for each such RxUE 104*b* is smaller. In cases where the gNB 102*a* of the TxUE 104*a* aligns the active times across Uu and SL, the TxUE 104*a* reports the information about channel quality. Where the gNB 102*a* connected in Uu to the TxUE 104*a* determines alignment, the TxUE 104*a* can report traffic pattern as a list of {periodicity, packet size} for each SL connected RxUE 104*b*.

For a TxUE 104*a* connected to multiple RxUEs 104*b* in SL in DRX, the TxUE 104*a* (or its gNB 102*a*) aligns the TxUE 104*a* Uu DRX active time with all RxUE 104*b* SL DRX active times, and all the RxUE 104*b* SL DRX active times are within the TxUE 104*a* active time. Where two RxUE's SL DRX active times may overlap, alignment according to the present technology depends on TxUE 104*a* capability—it requires the TxUE 104*a* be able to switch beams to send to another RxUE 104*b* quickly, e.g., "fastBeamSwitch." In such situations, decisions on TxUE 104*a* active time (start, offset, and onDuration) require that the start of TxUE 104*a* active time be earlier than or equal to the earliest start of RxUE 104*b* active times minus the offset (a minimum of onDuration-Offset), and that the end of TxUE 104*a* active time (the start time plus the onDuration) be later than or equal to the latest end of RxUE 104*b* active times. If the TxUE 104*a* is not capable of fastBeamSwitch, then the RxUE 104*b* active times of the multiple RxUEs 104*b* may not overlap.

In cases where the gNB 102*a* of the TxUE 104*a* determines alignment, both onDuration-Offset and fastBeamSwitch can be communicated to the gNB 102*a*, for example using the RRC information element (IE) such as UE-NR-Capability. The onDuration-Offset indicates the minimal offset value, it is applicable to both FR1 and FR2, so it is in phy-ParametersCommon portion of UE-NR-Capability. The fastBeamSwitch indicates if the UE is able to switch beam quickly, which is only applicable to FR2, so fastBeamSwitch is in phy-ParametersFR2. Each of these elements of phy-Parameters is illustrated in TABLE 1.

TABLE 1

```
UE-NR-Capability ::= SEQUENCE {
    accessStratumRelease       AccessStratumRelease,
    pdcp-Parameters            PDCP-Parameters,
    rlc-Parameters             RLC-Parameters OPTIONAL,
    mac-Parameters             MAC-Parameters OPTIONAL,
    phy-Parameters             Phy-Parameters,
    ...
}
Phy-Parameters ::= SEQUENCE {
    phy-ParametersCommon       Phy-ParametersCommon        OPTIONAL,
    phy-ParametersXDD-Diff     Phy-ParametersXDD-Diff      OPTIONAL,
    phy-ParametersFRX-Diff     Phy-ParametersFRX-Diff      OPTIONAL,
    phy-ParametersFR1          Phy-ParametersFR1           OPTIONAL,
    phy-ParametersFR2          Phy-ParametersFR2           OPTIONAL
}
    Phy-ParametersCommon ::= SEQUENCE {
    onDuration-Offset              ENUMERATED {supported}        OPTIONAL,
    csi-RS-CFRA-ForHO ENUMERATED {supported} OPTIONAL,
    dynamicPRB-BundlingDL ENUMERATED {supported} OPTIONAL,
    ...
}
    Phy-ParametersFR2 ::=   SEQUENCE {
    calibrationGapPA               ENUMERATED {supported}        OPTIONAL,
    pdsch-RE-MappingFR2            ENUMERATED {n6, n20}          OPTIONAL,
    fastBeamSwitch                 Boolean{True, False}          OPTIONAL,
    ...
}
```

For an RxUE 104*b* connected to multiple TxUEs 104*a* in SL in DRX, the RxUE 104*b* SL DRX active times must align with all such TxUE 104*a* Uu DRX active times, and be within a TxUE 104*a* Uu DRX active time. In some such cases, the RxUE 104*b* may be able to monitor SL signaling and messaging from multiple TxUEs 104*a*. In such cases, the RxUE 104*b* can provide signaling assistance to each TxUE 104*a*, e.g., using a Boolean IE such as numTxUEs-monitor—a Boolean flag. Where the TxUE 104*a* gNB 102*a* determines alignment, the TxUE 104*a* can TxUE 104*a* can report its counterpart RxUE 104*b* capability in the SidelinkUEInformationNR message for unicast to the gNB 102*a*, which is used for the indication of NR sidelink UE information to the network as shown in TABLE 2.

TABLE 2

```
SidelinkUEInformationNR-r16-IEs ::= SEQUENCE {
sl-RxInterestedFreqList-r16    SL-InterestedFreqList-r16    OPTIONAL,
sl-TxResourceReqList-r16       SL-TxResourceReqList-r16     OPTIONAL,
sl-FailureList-r16             SL-FailureList-r16                           OPTIONAL,
lateNonCriticalExtension       OCTET STRING                 OPTIONAL,
nonCriticalExtension           SEQUENCE { }                 OPTIONAL,
monitorMultipleTxUEs           Boolean{True, False}                         OPTIONAL
}
```

Assistance information from the RxUE 104b can include the RxUE 104b Uu DRX configuration. The TxUE 104a (or its gNB 102a) can select SL C-DRX active times that are aligned with RxUE 104b Uu DRX. The RxUE 104b Uu DRX may be C-DRX or I-DRX. Assistance information from the RxUE 104b can include a list of the RxUE 104b available UuC-DRX configurations. In such cases, the TxUE 104a (or its gNB 102a) can align its active times with one of the available RxUE 104b Uu DRX active times. Assistance information from the RxUE 104b can include existing SL C-DRX configurations from other TxUEs. In such cases, the TxUE 104a (or its NB) can select an SL C-DRX that does not overlap with existing SL C-DRX configurations from the other TxUEs. Assistance information from the RxUE 104b can include preferred SL C-DRX configuration from the RxUE 104b or the RxUE's gNB 102b. In such cases the RxUE 104b can take into account its Uu C-DRX configuration when requesting the preferred SL C-DRX configuration.

Layer 3 signaling of the RxUE 104b Uu DRX configuration can use an RRC message containing the whole RxUE 104b Uu DRX configuration (e.g., using RRC IE DRX-Config-List::=SEQUENCE {DRX-Config1, DRX-Config2, ... }, or the RRC message alignment-only subset (e.g., using RRC IE DRX-Config-Alignment-List::=SEQUENCE {DRX-Config-Alignment1, DRX-Config-Alignment2, ... }). Instead of a single RxUE 104b Uu DRX configuration in assistance information, the assistance information may include a list of possible RxUE 104b Uu DRX configurations, so that TxUE 104a (or the gNB 102a) may align with one of the possible RxUE 104b Uu DRX configurations. Because the selected SL DRX aligns with one of the RxUE 104b Uu DRX provided by gNB 102b or the RxUE 104b, the gNB 102b is able to align RxUE 104b Uu DRX with the selected SL DRX. The list of RxUE 104b Uu DRX configurations can be presented in order of preference.

The RxUE 104b can have SL connection with multiple TxUEs 104a. Each TxUE 104a sets an SL DRX configuration for the RxUE 104b. Each TxUE 104a sets an SL DRX configuration based on existing SL DRX configurations and TxUE 104a capability. If the RxUE 104b cannot monitor signaling/messages from different TxUEs 104a simultaneously, the active times of each SL DRX should not overlap (works on FR2 and single panel). If the RxUE 104b can monitor the signaling/messages from different TxUEs 104a simultaneously, then the active times of different SL DRX configurations may overlap (works on FR1 or multiple panels). Where the gNB 102a of a given TxUE 104a sets alignment, the gNB 102a selects SL DRX active time for the given TxUE 104a that does not overlap with existing SL DRX active times of other TxUEs. Layer 3 signaling of existing SL DRX configurations from other TxUEs can be through RRX message; and can contain either each whole SL DRX configuration, e.g., sl-DRX-Config-List::=SEQUENCE {sl-DRX-Config1, sl-DRX-Config2, ... }, or only parameters related to alignment, e.g., sl-DRX-Config-Alignment-List::=SEQUENCE {sl-DRX-Config-AL1, sl-DRX-Config-ALignment2, ... }.

A gNB 102b of an RxUE 104b can provide a list of preferred SL DRX configurations that are compatible with the RxUE 104b Uu DRX configuration. The preferred SL DRX configurations can be aligned with current RxUE 104b Uu DRX configurations. In some aspects, the preferred SL DRX configurations for the RxUE 104b may not be aligned with the current RxUE's Uu DRX configuration—but the gNB 102b of the RxUE 104b can align the RxUE 104b UU DRX with the SL DRX since it is provided by the gNB 102b of the RxUE 104b. Layer 3 signaling of preferred SL DRX configurations by the RxUE 104b or its gNB 102b can contain either each whole SL DRX configuration, e.g., Sl-DRX-Config-List::=SEQUENCE {Sl-DRX-Config1, Sl-DRX-Config2, ... }, or only parameters related to alignment, e.g., Sl-DRX-Config-Alignment-List::=SEQUENCE {Sl-DRX-Config-ALignment1, Sl-DRX-Config-ALignment2, ... }.

Figure 5:
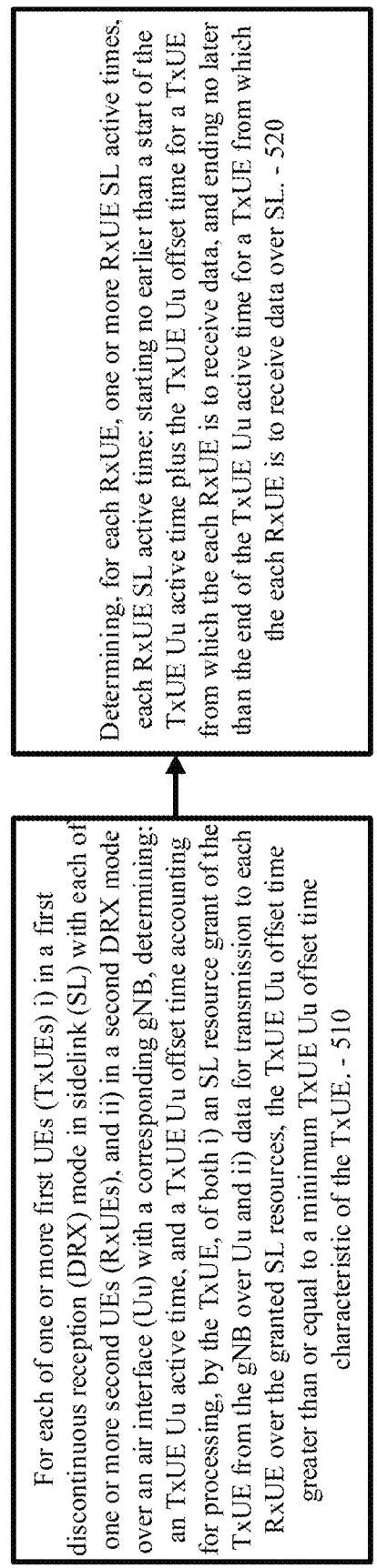
FIG. 5 is a flowchart of methods of wireless communication is shown, in accordance with examples of the technology disclosed herein.

Referring to FIG. 5, and continuing to refer to prior figures for context, a flowchart of methods 500 of wireless communication is shown, in accordance with examples of the technology disclosed herein. In such methods 500, for each of one or more first UEs (TxUEs) in a first discontinuous reception (DRX) mode in sidelink (SL) with each of one or more second UEs (RxUEs), and ii) in a second DRX mode over an air interface (Uu) with a corresponding gNB, determining by a computing device: an TxUE Uu active time, and a TxUEUu offset time—Block 510. The offset time accounts for processing, by the TxUE, of both i) an SL resource grant of the TxUE from the gNB over Uu and ii) data for transmission to eachRxUE over the granted SL resources, the TxUE Uu offset time greater than or equal to a minimum TxUE Uu offset time of the TxUE.

Figure 12:
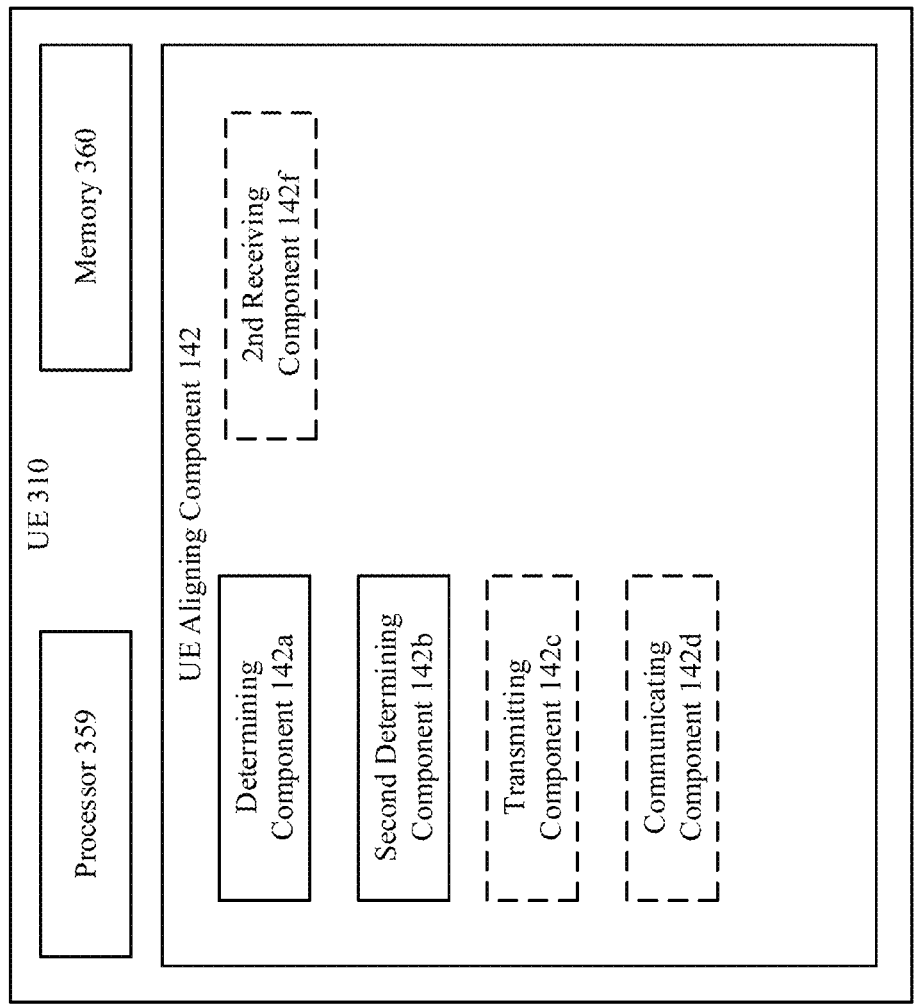
FIG. 12 is a block diagram of a UE, in accordance with examples of the technology disclosed herein.

Referring to FIG. 12, and continuing to refer to prior figures for context, another representation of the UE 350 for wireless communication of FIG. 3 is shown, in accordance with examples of the technology disclosed herein. UE 350 includes UE aligning component 142, controller/processor 359, and memory 360, as described in conjunction with FIG. 3 above. UE aligning component 142 includes determining component 142a. In some examples, the determining component 142a determines, for each of one or more first UEs (TxUEs) i) in a first discontinuous reception (DRX) mode in sidelink (SL) with each of one or more second UEs (RxUEs), and ii) in a second DRX mode over an air interface (Uu) with a corresponding gNB: an TxUE Uu active time, and a TxUE Uu offset time. Accordingly, determining component 142a may provide means for determining, for each of one or more first UEs (TxUEs) i) in a first discontinuous reception (DRX) mode in sidelink (SL) with each of one or more second UEs (RxUEs), and ii) in a second DRX mode over an air interface (Uu) with a corresponding gNB: an TxUE Uu active time, and a TxUE Uu offset time.

Figure 13:
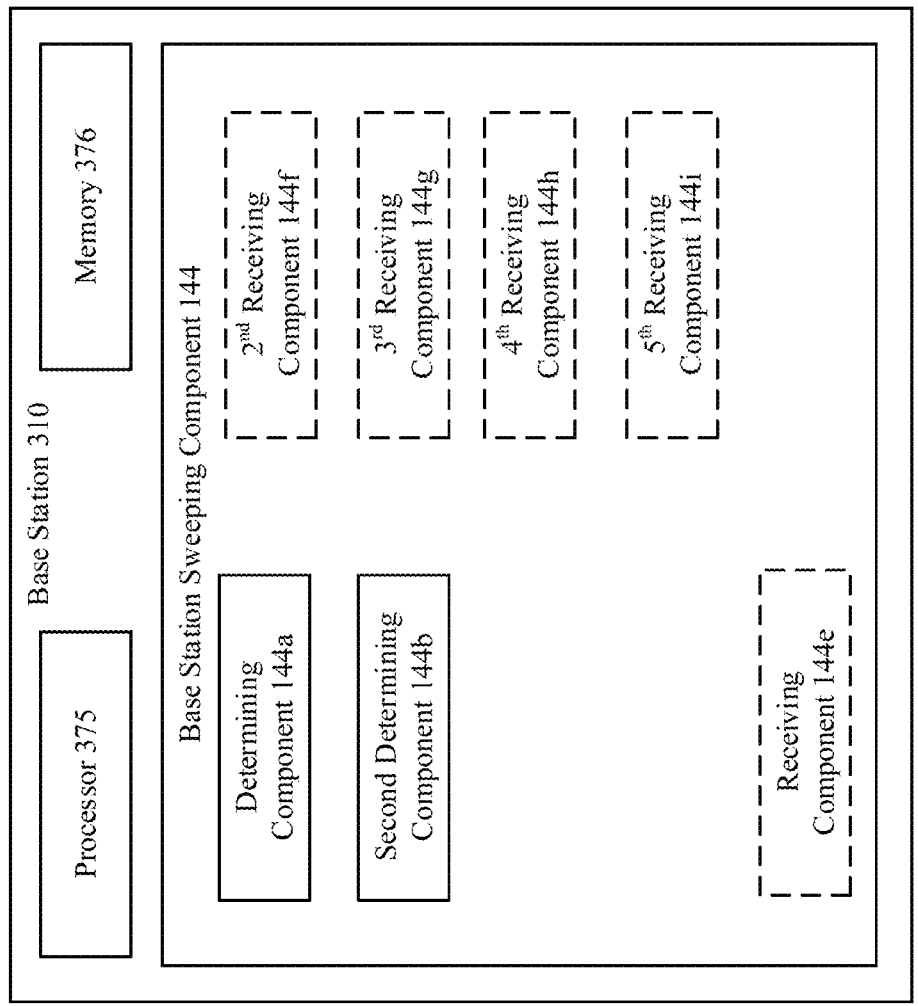
FIG. 13 is a block diagram of a base station, in accordance with examples of the technology disclosed herein.

Referring to FIG. 13, and continuing to refer to prior figures for context, another representation of the base station 310 for wireless communication of FIG. 3 is shown, in accordance with examples of the technology disclosed herein. Base station 310 (e.g., a gNB) includes base station aligning component 144, controller/processor 375, and memory 376, as described in conjunction with FIG. 3 above. Base station aligning component 144 includes determining component 144a. In some examples, the determining component 144a determines, for each of one or more first UEs (TxUEs) i) in a first discontinuous reception (DRX) mode in sidelink (SL) with each of one or more second UEs (RxUEs), and ii) in a second DRX mode over an air interface (Uu) with a corresponding gNB: an TxUE Uu active time, and a TxUE Uu offset time. Accordingly, determining component 144a may provide means for determining, for each of one or more first UEs (TxUEs) i) in a first discontinuous reception (DRX) mode in sidelink (SL) with each of one or more second UEs (RxUEs), and ii) in a second DRX mode over an air interface (Uu) with a corresponding gNB: an TxUE Uu active time, and a TxUE Uu offset time.

In some examples, each TxUE Uu active time comprises a TxUE Uu active time start and a TxUE Uu active time duration (TxUE onDuration). In some examples, each RxUE SL active time comprises an RxUE active time start and RxUE active time duration (RxUE onDuration). In some examples, each RxUE onDuration is a function of one or more of: path loss in SL between the each RxUE and the corresponding TxUE; a traffic pattern between the each RxUE and the corresponding TxUE in SL; a number of RxUEs connected in SL to the corresponding TxUE; and a quality of service required between the each RxUE and the corresponding TxUE in SL.

In some examples, a particular TxUE of the one or more TxUEs is not capable of communicating in SL with a plurality of RxUEs having overlapping RxUE SL active times. In such examples, determining, for each RxUE, one or more RxUE SL active times corresponding to the particular TxUE further comprises determining one or more RxUE SL active times that do not overlap with active times of another RxUE in SL communication with the particular TxUE.

In some examples, a particular RxUE of the one or more RxUEs is not capable of receiving signals from multiple TxUEs at a same time. In such examples, determining a TxUE active time comprises determining a TxUE active time that does not overlap with an active time of another TxUE in SL communication with the particular RxUE.

Referring again to FIG. 5, the computing device second determines, for each RxUE, one or more RxUE SL active times—Block 520. Each RxUE SL active time starts no earlier than a start of the TxUE Uu active time plus the TxUE Uu offset time for a TxUE from which the each RxUE is to receive data, and ends no later than the end of the TxUE Uu active time for a TxUE from which the each RxUE is to receive data over SL.

Referring to FIG. 12, UE aligning component 142 includes second determining component 142b. In some examples, second determining component 142b determines for each RxUE, one or more RxUE SL active times, each RxUE SL active time: starting no earlier than a start of the TxUE Uu active time plus the TxUE Uu offset time for a TxUE from which the each RxUE is to receive data, and ending no later than the end of the TxUE Uu active time for a TxUE from which the each RxUE is to receive data over SL. Accordingly, second determining component 142b may provide means for determining, for each RxUE, one or more RxUE SL active times, each RxUE SL active time: starting no earlier than a start of the TxUE Uu active time plus the TxUE Uu offset time for a TxUE from which the each RxUE is to receive data, and ending no later than the end of the TxUE Uu active time for a TxUE from which the each RxUE is to receive data over SL.

Referring to FIG. 13, base station aligning component 144 includes second determining component 144b. In some examples, second determining component 144b determines for each RxUE, one or more RxUE SL active times, each RxUE SL active time: starting no earlier than a start of the TxUE Uu active time plus the TxUE Uu offset time for a TxUE from which the each RxUE is to receive data, and ending no later than the end of the TxUE Uu active time for a TxUE from which the each RxUE is to receive data over SL. Accordingly, second determining component 144b may provide means for determining, for each RxUE, one or more RxUE SL active times, each RxUE SL active time: starting no earlier than a start of the TxUE Uu active time plus the TxUE Uu offset time for a TxUE from which the each RxUE is to receive data, and ending no later than the end of the TxUE Uu active time for a TxUE from which the each RxUE is to receive data over SL.

Figure 6:
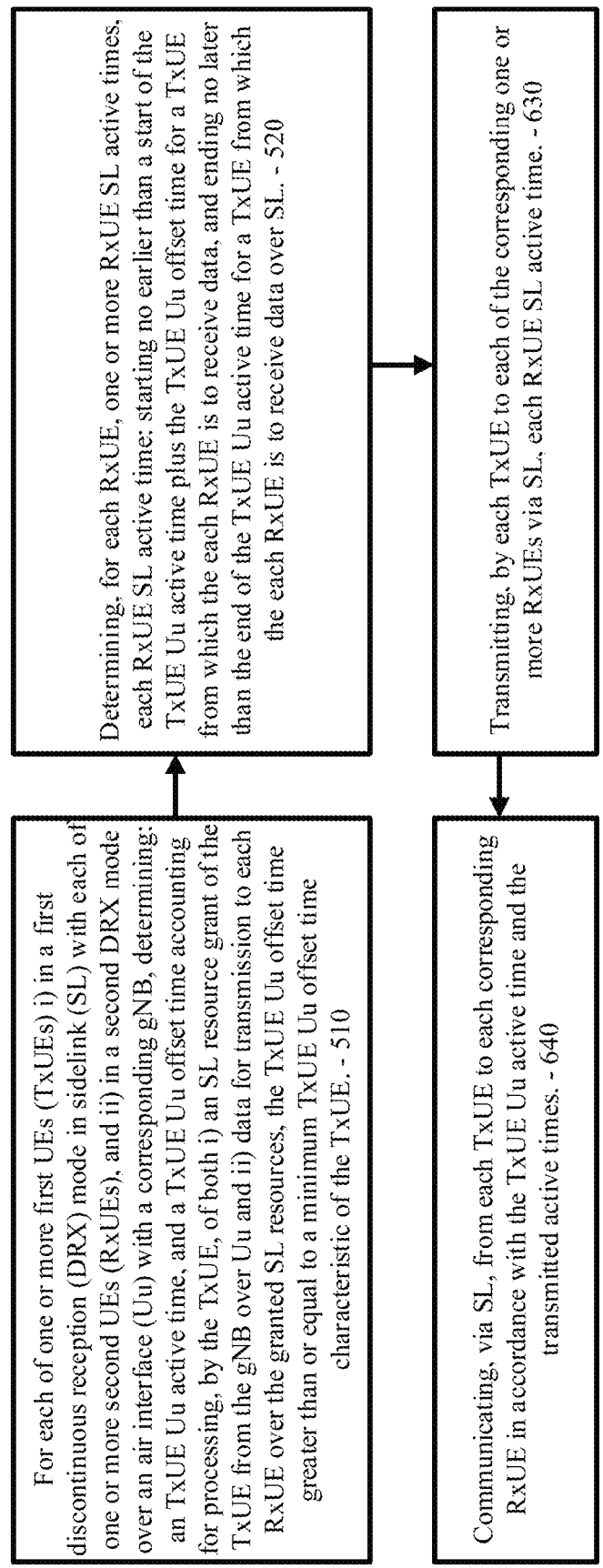
FIG. 6 is a flowchart of methods of wireless communication is shown, in accordance with examples of the technology disclosed herein.

Referring to FIG. 6, and continuing to refer to prior figures for context, a flowchart of methods 600 of wireless communication is shown, in accordance with examples of the technology disclosed herein. In such methods 600, Block 510 and Block 520 are performed as described above in connection with FIG. 5. In such methods, a TxUE transmits, to each of the corresponding one or more RxUEs via SL, each RxUE SL active time—Block 630.

Referring again to FIG. 12, UE aligning component 142 includes transmitting component 142c. In some examples, transmitting component 142c transmits, from each TxUE to each of the corresponding one or more RxUEs via SL, each RxUE SL active time. Accordingly, transmitting component 142c may provide means for transmitting, from each TxUE to each of the corresponding one or more RxUEs via SL, each RxUE SL active time.

In such methods 600 the TxUE communicates, via SL, to each corresponding RxUE in accordance with the TxUE Uu active time and the transmitted active times—Block 640.

Referring again to FIG. 12, UE aligning component 142 includes communicating component 142d. In some examples, communicating component 142d communicates, via SL, to each corresponding RxUE in accordance with the TxUE Uu active time and the transmitted active times. Accordingly, communicating component 142d may provide means for communicating, via SL, to each corresponding RxUE in accordance with the TxUE Uu active time and the transmitted active times.

Referring to FIG. 7, and continuing to refer to prior figures for context, a flowchart of methods 700 of wireless communication is shown, in accordance with examples of the technology disclosed herein. In such methods 700, Block 510 and Block 520 are performed as described above in connection with FIG. 5, with the additional feature that each TxUE Uu active time comprises a TxUE Uu active time start and a TxUE Uu active time duration (TxUE onDuration); each RxUE SL active time comprises an RxUE active time start and RxUE active time duration (RxUE onDuration); and each RxUE onDuration is a function of one or more of: path loss in SL between the each RxUE and the corresponding TxUE; a traffic pattern between the each RxUE and the corresponding TxUE in SL; a number of RxUEs connected in SL to the corresponding TxUE; and a quality of service required between the each RxUE and the corresponding TxUE in SL. In such methods, the gNB of the TxUE receives, prior to each determining, by the corresponding TxUE to the corresponding gNB at least one of i) the path loss in SL between each RxUE and the corresponding TxUE, and ii) the traffic pattern as list of {periodicity, packet size} for each of one or more data flows—Block 750. In some examples, each RxUE onDuration is less than or equal to a corresponding TxUE onDuration.

Referring to FIG. 13, base station aligning component 144 includes receiving component 144e. In some examples, receiving component 144e receives, prior to each determining, from the corresponding TxUE by the corresponding gNB at least one of i) the path loss in SL between each RxUE and the corresponding TxUE, and ii) the traffic pattern as list of {periodicity, packet size} for each of one or more data flows. Accordingly, receiving component 144e may provide means for receiving, prior to each determining, by the corresponding TxUE to the corresponding gNB at least one of i) the path loss in SL between each RxUE and the corresponding TxUE, and ii) the traffic pattern as list of {periodicity, packet size} for each of one or more data flows.

Figure 8:
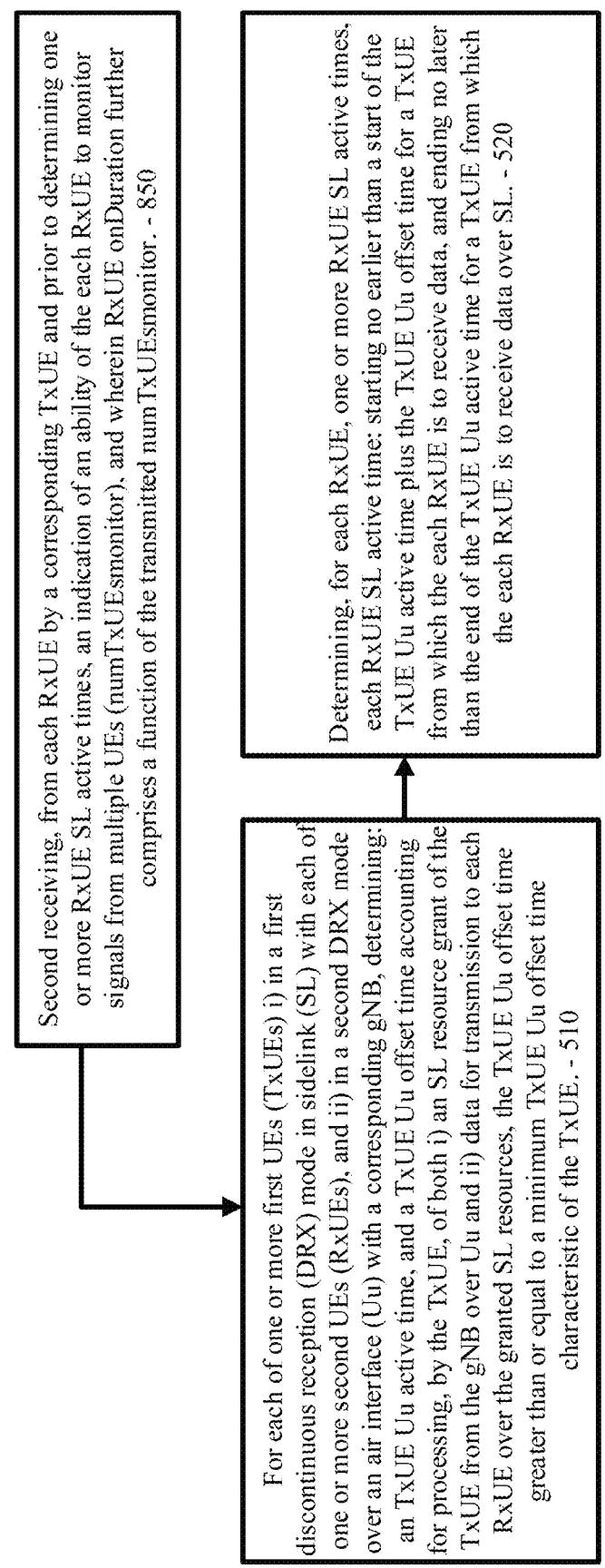
FIG. 8 is a flowchart of methods of wireless communication is shown, in accordance with examples of the technology disclosed herein.

Referring to FIG. 8, and continuing to refer to prior figures for context, a flowchart of methods 800 of wireless communication is shown, in accordance with examples of the technology disclosed herein. In such methods 800, Block 510 and Block 520 are performed as described above in connection with FIG. 5, with the additional feature that each TxUE Uu active time comprises a TxUE Uu active time start and a TxUE Uu active time duration (TxUE onDuration); each RxUE SL active time comprises an RxUE active time start and RxUE active time duration (RxUE onDuration); and each RxUE onDuration is a function of one or more of: path loss in SL between the each RxUE and the corresponding TxUE; a traffic pattern between the each RxUE and the corresponding TxUE in SL; a number of RxUEs connected in SL to the corresponding TxUE; and a quality of service required between the each RxUE and the corresponding TxUE in SL. In such methods, second receiving, from each RxUE by the corresponding TxUE and prior to determining one or more RxUE SL active times, an indication of an ability of the each RxUE to monitor signals from multiple UEs (numTxUEsmonitor), and wherein RxUE onDuration further comprises a function of the transmitted numTxUEsmonitor—Block 850.

Referring to FIG. 12, UE aligning component 142 includes second receiving component 142f. In some examples, second receiving component 142f receives, from each RxUE by a corresponding TxUE and prior to determining one or more RxUE SL active times, an indication of an ability of the each RxUE to monitor signals from multiple UEs (numTxUEsmonitor) wherein RxUE onDuration further comprises a function of the transmitted numTxUEsmonitor. Accordingly, second receiving component 142f may provide means for receiving, from each RxUE by a corresponding TxUE and prior to determining one or more RxUE SL active times, an indication of an ability of the each RxUE to monitor signals from multiple UEs (numTxUEsmonitor), wherein RxUE onDuration further comprises a function of the transmitted numTxUEsmonitor.

Referring to FIG. 13, base station aligning component 144 includes second receiving component 144f. In some examples, second receiving component 144f receives, from each RxUE by a corresponding TxUE and prior to determining one or more RxUE SL active times, an indication of an ability of the each RxUE to monitor signals from multiple UEs (numTxUEsmonitor) wherein RxUE onDuration further comprises a function of the transmitted numTxUEs- monitor. Accordingly, second receiving component 144f may provide means for receiving, from each RxUE by a corresponding TxUE and prior to determining one or more RxUE SL active times, an indication of an ability of the each RxUE to monitor signals from multiple UEs (numTxUEs- monitor), wherein RxUE onDuration further comprises a function of the transmitted numTxUEsmonitor. In some such examples, where the alignment is performed by the gNB 102a of the TxUE 104a, the TxUE 104a reports the received information to the gNB 102a.

Figure 9:
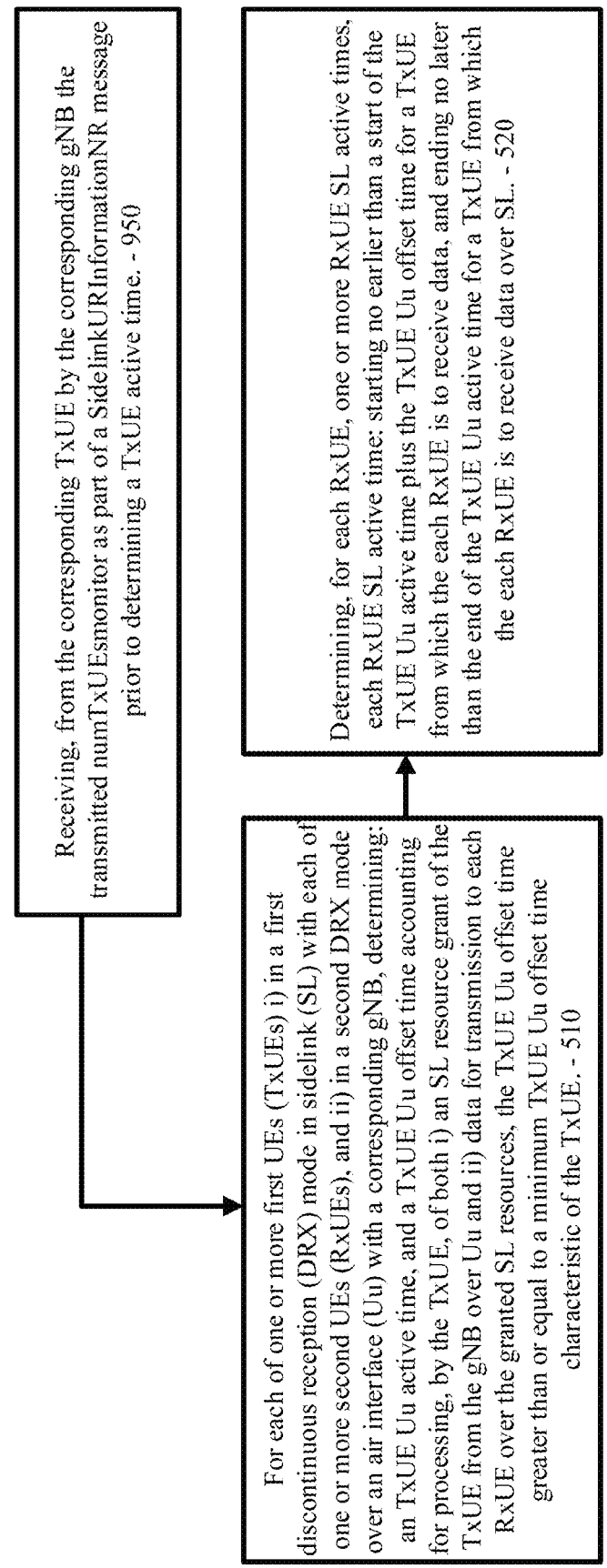
FIG. 9 is a block diagram of a UE, in accordance with examples of the technology disclosed herein.

Referring to FIG. 9, and continuing to refer to prior figures for context, a flowchart of methods 900 of wireless communication is shown, in accordance with examples of the technology disclosed herein. In such methods 900, Block 510 and Block 520 are performed as described above in connection with FIG. 5, with the additional feature that each TxUE Uu active time comprises a TxUE Uu active time start and a TxUE Uu active time duration (TxUE onDuration); each RxUE SL active time comprises an RxUE active time start and RxUE active time duration (RxUE onDuration); and each RxUE onDuration is a function of one or more of: path loss in SL between the each RxUE and the corresponding TxUE; a traffic pattern between the each RxUE and the corresponding TxUE in SL; a number of RxUEs connected in SL to the corresponding TxUE; and a quality of service required between the each RxUE and the corresponding TxUE in SL. In such methods, the corresponding gNB receives, from the corresponding TxUE, the transmitted numTxUEsmonitor as part of a SidelinkURInformationNR message prior to determining a TxUE active time—Block 950.

Referring to FIG. 13, base station aligning component 144 includes third receiving component 144g. In some examples, reporting component 144g receives, from the corresponding TxUE, the transmitted numTxUEsmonitor as part of a SidelinkURInformationNR message prior to determining a TxUE active time. Accordingly, reporting component 144g may provide means for receiving, from the corresponding TxUE, the transmitted numTxUEsmonitor as part of a SidelinkURInformationNR message prior to determining a TxUE active time. Conversely, though not shown, the corresponding TxUE transmits the numTxUEsmonitor as part of a SidelinkURInformationNR message prior to the gNB determining a TxUE active time.

Figure 10:
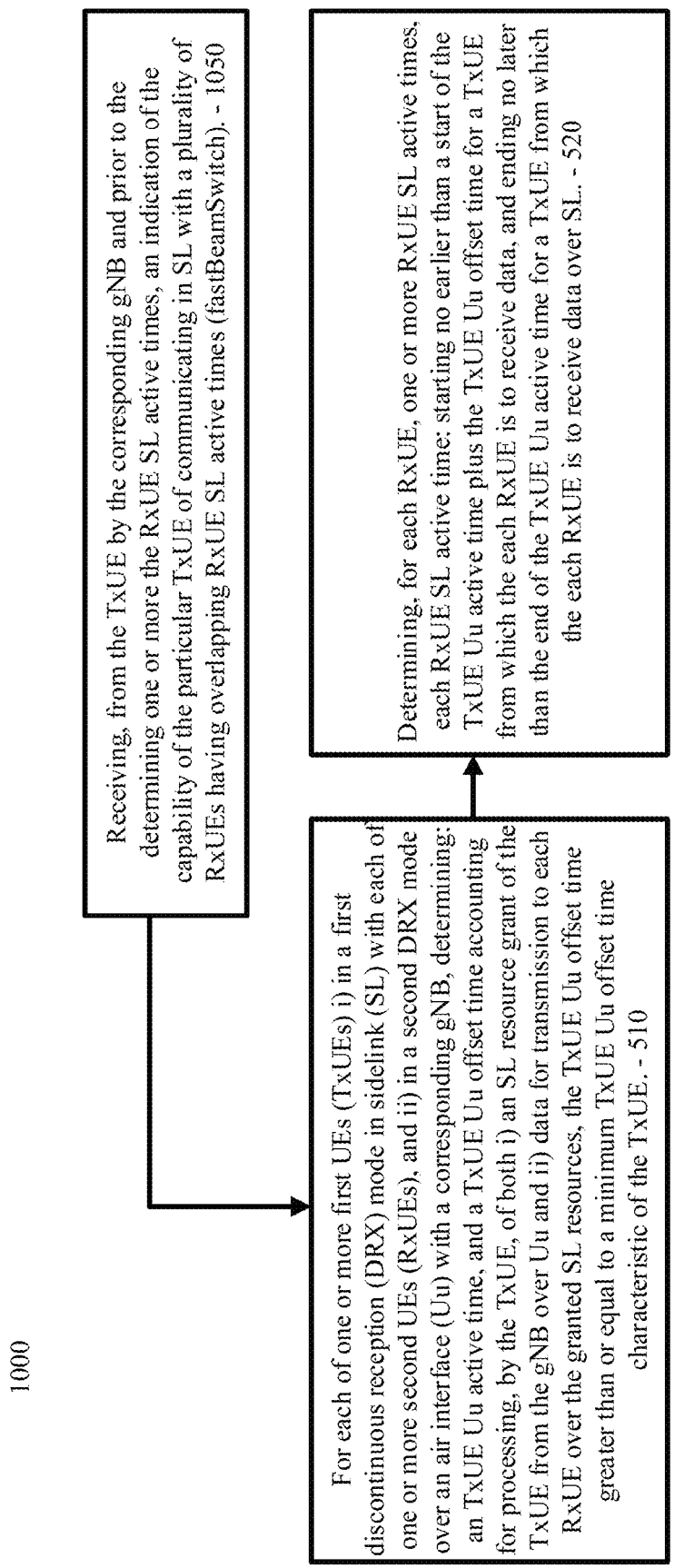
FIG. 10 a flowchart of methods of wireless communication is shown, in accordance with examples of the technology disclosed herein.

Referring to FIG. 10, and continuing to refer to prior figures for context, a flowchart of methods 1000 of wireless communication is shown, in accordance with examples of the technology disclosed herein. In such methods 1000, Block 510 and Block 520 are performed as described above in connection with FIG. 5, with the additional feature that each TxUE Uu active time comprises a TxUE Uu active time start and a TxUE Uu active time duration (TxUE onDuration); each RxUE SL active time comprises an RxUE active time start and RxUE active time duration (RxUE onDuration); and each RxUE onDuration is function of one or more of: path loss in SL between the each RxUE and the corresponding TxUE; a traffic pattern between the each RxUE and the corresponding TxUE in SL; a number of RxUEs connected in SL to the corresponding TxUE; and a quality of service required between the each RxUE and the corresponding TxUE in SL. In such methods 1000, a particular TxUE of the one or more TxUEs is capable of communicating in SL with a plurality of RxUEs having overlapping RxUE SL active times, and each determining is performed in the gNB corresponding to the TxUE.

Further in such methods 1000, the corresponding gNB receives, from the TxUE and prior to the determining one or more the RxUE SL active times, an indication of the capability of the particular TxUE of communicating in SL with a plurality of RxUEs having overlapping RxUE SL active times (fastBeamSwitch)—Block 1050. In such methods 1000, determining, for each RxUE, one or more RxUE SL active times corresponding to the particular TxUE further comprises determining one or more RxUE SL active times that overlap with active times of another RxUE in SL communication with the particular TxUE only if fastBeamSwitch is indicated for the particular TxUE.

In some such methods 1000, the receiving comprises receiving the fastBeamSwitch using a Radio Resource Control (RRC) information element (IE) UE-NR-Capability as a physical parameter specific to Frequency Range 2 (FR2).

Referring to FIG. 13, base station aligning component 144 includes fourth receiving component 144h. In some examples, fourth receiving component 144h receives, from the TxUE and prior to the determining one or more the RxUE SL active times, an indication of the capability of the particular TxUE of communicating in SL with a plurality of RxUEs having overlapping RxUE SL active times (fastBeamSwitch). Accordingly, fourth receiving component 144h may provide means for receiving, from the TxUE and prior to the determining one or more the RxUE SL active times, an indication of the capability of the particular TxUE of communicating in SL with a plurality of RxUEs having overlapping RxUE SL active times (fastBeamSwitch).

Figure 11:
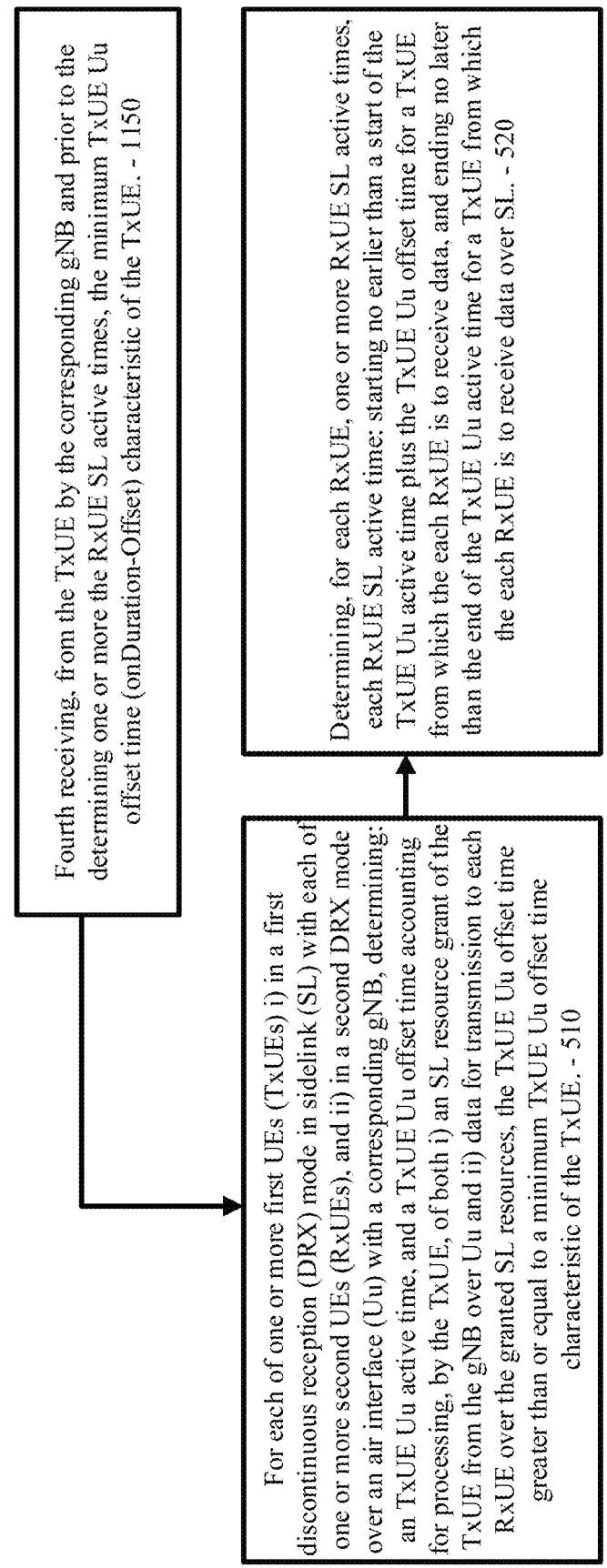
FIG. 11 a flowchart of methods of wireless communication is shown, in accordance with examples of the technology disclosed herein.

Referring to FIG. 11, and continuing to refer to prior figures for context, a flowchart of methods 1100 of wireless communication is shown, in accordance with examples of the technology disclosed herein. In such methods 1100, Block 510 and Block 520 are performed as described above in connection with FIG. 5, with the additional feature that each TxUE Uu active time comprises a TxUE Uu active time start and a TxUE Uu active time duration (TxUE onDuration); each RxUE SL active time comprises an RxUE active time start and RxUE active time duration (RxUE onDuration); and each RxUE onDuration is a function of one or more of: path loss in SL between the each RxUE and the corresponding TxUE; a traffic pattern between the each RxUE and the corresponding TxUE in SL; a number of RxUEs connected in SL to the corresponding TxUE; and a quality of service required between the each RxUE and the corresponding TxUE in SL. In such methods 1100, each determining is performed in the gNB corresponding to the TxUE.

Further in such methods 1000, the corresponding gNB fifth receives, from the TxUE by the corresponding gNB and prior to the determining one or more the RxUE SL active times, the minimum TxUE Uu offset time (onDuration-Offset) of the TxUE—Block 1150. In some such methods 1000, the receiving comprises receiving the fastBeamSwitch using a Radio Resource Control (RRC) information element (IE) UE-NR-Capability as a physical parameter specific to Frequency Range 2 (FR2).

Referring to FIG. 13, base station aligning component 144 includes fifth receiving component 144i. In some examples, fifth receiving component 144i fifth receives, from the TxUE by the corresponding gNB and prior to the determining one or more the RxUE SL active times, the minimum TxUE Uu offset time (onDuration-Offset) of the TxUE Accordingly, fifth receiving component 144i may provide means for fifth receiving, from the TxUE by the corresponding gNB and prior to the determining one or more the RxUE SL active times, the minimum TxUE Uu offset time (onDuration-Offset) of the TxUE.

The following examples are illustrative only and aspects thereof may be combined with aspects of other embodiments or teaching described herein, without limitation.

Example 1 is method of wireless communication, in which for each of one or more first UEs (TxUEs) i) in a first discontinuous reception (DRX) mode in sidelink (SL) with each of one or more second UEs (RxUEs), and ii) in a second DRX mode over an air interface (Uu) with a corresponding gNB, determine a TxUE Uu active time, and a TxUE Uu offset time accounting for processing, by the TxUE, of both i) an SL resource grant of the TxUE from the gNB over Uu and ii) data for transmission to each RxUE over the granted SL resources. The TxUE Uu offset time is greater than or equal to a minimum TxUE Uu offset time of the TxUE. The example second determines, for each RxUE, one or more RxUE SL active times, each RxUE SL active time: starting no earlier than a start of the TxUE Uu active time plus the TxUE Uu offset time for a TxUE from which the each RxUE is to receive data, and ending no later than the end of the TxUE Uu active time for a TxUE from which the each RxUE is to receive data over SL.

Example 2 includes the Example 1, further including transmitting, by each TxUE to each of the corresponding one or more RxUEs via SL, each RxUE SL active time; and communicating, via SL, from each TxUE to each corresponding RxUE in accordance with the TxUE Uu active time and the transmitted active times . . . . Example 3 includes either of Example 1 and Example 2, wherein configuring includes pre-configuring the UE with the one or more conditions.

Example 3 includes any one or more of Example 1 and Example 2, wherein each TxUE Uu active time comprises a TxUE Uu active time start and a TxUE Uu active time duration (TxUE onDuration); each RxUE SL active time comprises an RxUE active time start and RxUE active time duration (RxUE onDuration); and each RxUE onDuration is a function of one or more of: path loss in SL between the each RxUE and the corresponding TxUE; a traffic pattern between the eachRxUE and the corresponding TxUE in SL; a number of RxUEs connected in SL to the corresponding TxUE; and a quality of service required between the each RxUE and the corresponding TxUE in SL.

Example 4 includes any one or more of Example 1-Example 3, wherein each determining is performed in the gNB corresponding to the corresponding TxUE; and the method further includes receiving, prior to each determining, from the corresponding TxUE by the corresponding gNB at least one of i) the path loss in SL between each RxUE and the corresponding TxUE, and ii) the traffic pattern as list of {periodicity, packet size} for each of one or more data flows.

Example 5 includes any one or more of Example 1-Example 4, wherein a particular TxUE of the one or more TxUEs is not capable of communicating in SL with a plurality of RxUEs having overlapping RxUE SL active times; and determining, for each RxUE, one or more RxUE SL active times corresponding to the particular TxUE further includes determining one or more RxUE SL active times that do not overlap with active times of another RxUE in SL communication with the particular TxUE.

Example 6 includes any one or more of Example 1-Example 5, wherein a particular RxUE of the one or more RxUEs is not capable of receiving signals from multiple TxUEs at a same time; and determining a TxUE active time includes determining a TxUE active time that does not overlap with an active time of another TxUE in SL communication with the particular RxUE.

Example 7 includes any one or more of Example 1-Example 6, further including second receiving, from each RxUE by the corresponding TxUE and prior to determining one or more RxUE SL active times, an indication of an ability of the each RxUE to monitor signals from multiple UEs (numTxUEsmonitor), and wherein RxUE onDuration further comprises a function of the received numTxUEsmonitor.

Example 8 includes any one or more of Example 1-Example 7, wherein each determining is performed in the gNB corresponding to the corresponding TxUE; and the method further includes third receiving, from the corresponding TxUE by the corresponding gNB the transmitted numTxUEsmonitor as part of a SidelinkURInformationNR message prior to determining a TxUE active time.

Example 9 includes any one or more of Example 1-Example 8, wherein a particular TxUE of the one or more TxUEs is capable of communicating in SL with a plurality of RxUEs having overlapping RxUE SL active times, and each determining is performed in the gNB corresponding to the TxUE Further, the method includes fourth receiving, from the TxUE to the corresponding gNB and prior to the determining one or more the RxUE SL active times, an indication of the capability of the particular TxUE of communicating in SL with a plurality of RxUEs having overlapping RxUE SL active times (fastBeamSwitch). In such methods, determining, for each RxUE, one or more RxUE SL active times corresponding to the particular TxUE further includes determining one or more RxUE SL active times that overlap with active times of another RxUE in SL communication with the particular TxUE only if fastBeamSwitchis indicated for the particular TxUE.

Example 10 includes any one or more of Example 1-Example 9, wherein the fourth receiving comprises fourth receiving the fastBeamSwitch using a Radio Resource Control (RRC) information element (IE) UE-NR-Capability as a physical parameter specific to Frequency Range 2 (FR2).

Example 11 includes any one or more of Example 1-Example 10, wherein each determining is performed in the gNB corresponding to the TxUE. Such examples further include fifth receiving, from the TxUE by the corresponding gNB and prior to the determining one or more the RxUE SL active times, the minimum TxUE Uu offset time (onDuration-Offset) of the TxUE.

Example 12 includes any one or more of Example 1-Example 11, wherein the fifth receiving comprises fifth receiving the onDuration-Offset using a Radio Resource Control (RRC) information element (IE) UE-NR-Capability as a physical parameter common to Frequency Range 1 (FR1) and Frequency Range 2 (FR2).

Example 13 includes an apparatus for wireless communication, comprising: a memory; and at least one processor coupled to the memory and configured to execute the method of any one or more of examples 1-12. Example 14 includes a computer-readable medium storing processor-executable code, the code when executed by a processor cause the processor to execute the method of any one or more of claims 1-12. Example 15 includes an apparatus for wireless communications, including means for executing the method of any one or more of claims 1-12.

As further explanation, consider that for mode 1, some alignment between the TxUEUu DRX and RxUE SL DRX should be considered to ensure that the SL grant scheduled for the TxUE during its Uu DRX active time falls into the SL DRX active time of the peer RxUE. The technology disclosed herein provides features related to the parameter OnDuration during the DRX alignment between TxUE and RxUE. The features can be useful when UEs connect to multiple UEs on SL.

Consider the start times for SL DRX onDuration. When TxUE operates in mode 1, it receives an SL grant from its gNB first, then initiates the SL transmission to RxUE. In general, it takes some time for TxUE to process the SL grant and data before the transmission.

Figure 14:
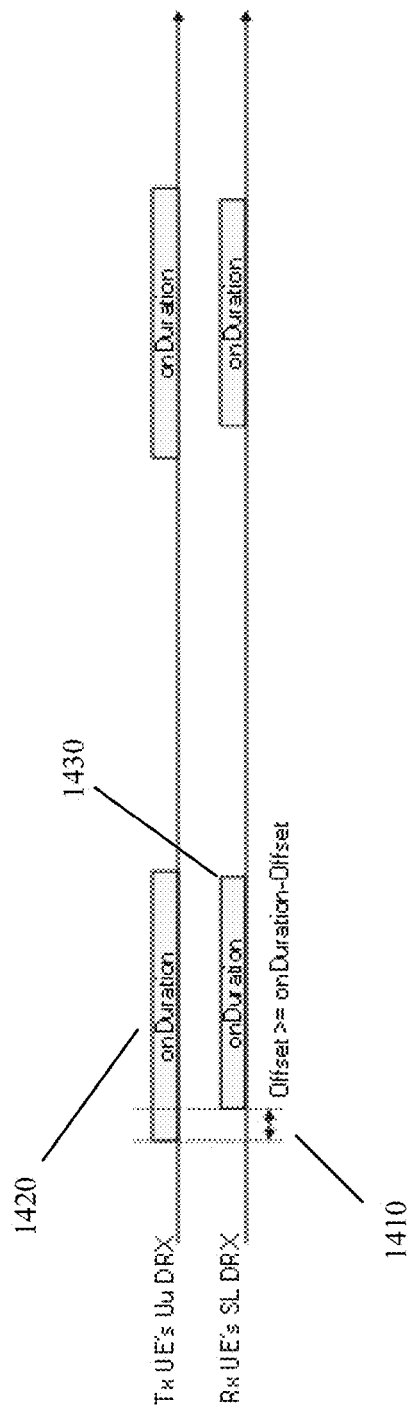
FIG. 14 illustrates an alignment diagram for an RxUE and a TxUE in SL, in accordance with examples of the technology disclosed herein.

During this time, RxUE does not need to monitor SL channel, as TxUE is unable to start transmission during the processing of SL grant and data. As shown in FIG. 14, there can be an Offset 1410 between the start of TxUE's onDuration 1420 on Uu and the start of RxUE's onDuration 1430 on SL. The value of the Offset 1410 can depend on TxUE's capability, i.e., how long it takes to process the SL grant and data. Starting the SL DRX onDuration 1430 after the Offset 1410 from the Uu DRX onDuration 1420 starting point would be beneficial to SL Rx UE for power saving. An Offset 1410 between TxUE's onDuration 1420 start and RxUE's onDuration 1430 start can be based on UE's capability for processing a grant and preparing a transmission. An SL UE capability, representing the amount of time a UE needs to process SL grant and prepare data transmission, may be indicated by the UE to its serving gNB.

Regarding the length of the SL DRX onDuration, it is possible that a TxUE unicasts with multiple RxUEs, and the RxUEs' onDuration may not be overlapped and should be aligned with TxUE's onDuration on Uu link. Useful information for TxUE's gNB to determine an appropriate onDuration for SL includes both traffic characteristics and QoS requirements. Regarding traffic characteristics, packet size can be used to determine the length of the onDuration. If a UE gets large packets for transmission, then it may require longer active time. Regarding QoS, onDuration should be selected based on QoS requirement. The gNB can optimize RxUE's SL DRX onDuration based on traffic volume, QoS requirement. In addition to RxUE's assistance information, SL traffic characteristics and associated QoS requirement also can be indicated to the TxUE's gNB for determining SL DRX onDuration.

Figure 15:
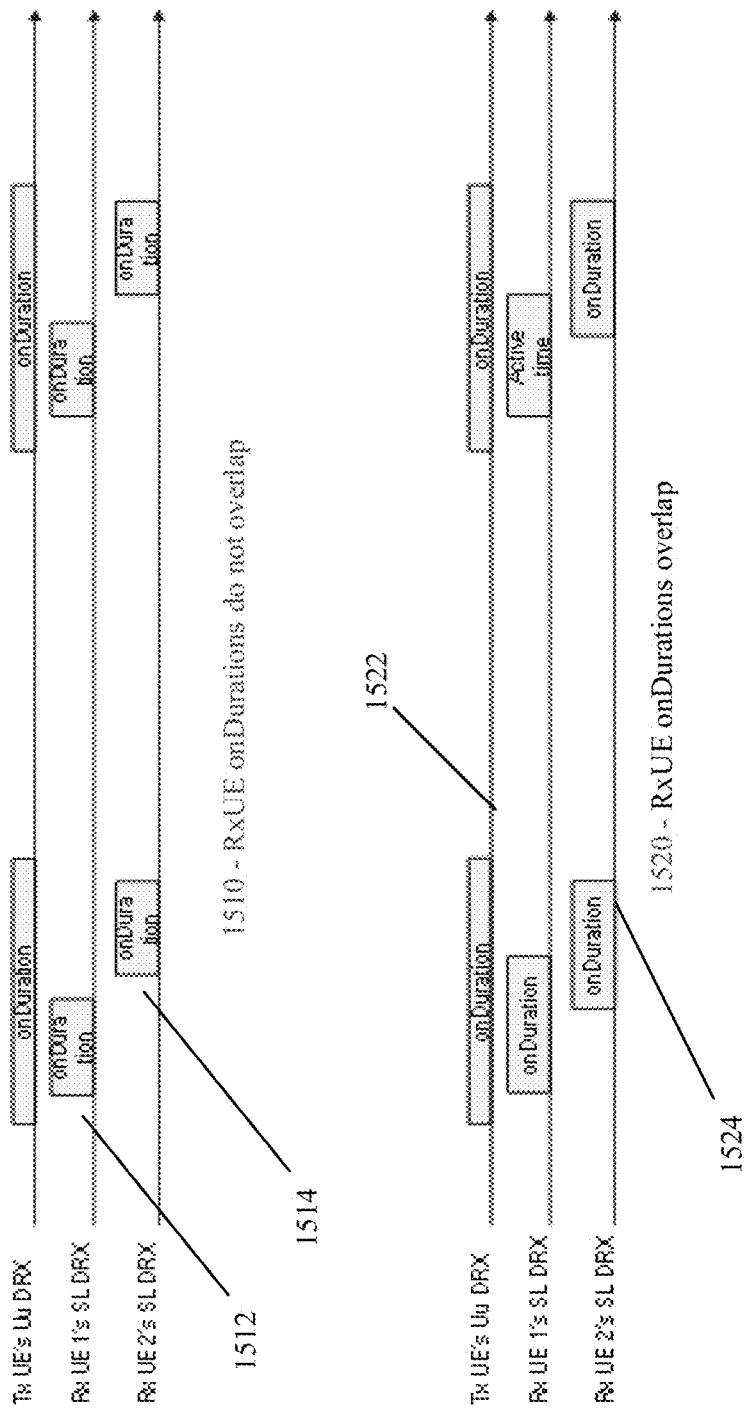
FIG. 15 illustrates alignment diagrams for multiple UEs in SL, in accordance with examples of the technology disclosed herein.

Consider scenarios where a UE may connect to multiple UEs on SL, and each DRX onDuration may be determined based on TX/RX UE capability. In some such scenarios, one TxUE may connect to multiple RxUEs on SL, and the RxUE's active times are within TxUE's active time. In a first of such scenarios 1510, as shown in FIG. 15, RX UE's SL onDurations (1512, 1514) do not overlap. If the TxUE does not have the capability to transmit simultaneously to the multiple UEs on SL it would require the non-overlapping DRX configurations. In a second such scenario 1520, RxUE's SL onDurations (1522, 1524) overlap. This scenario would not pose interruptions/missed data for the RxUEs when receiving from a common TX UE if the TxUE has the capability to transmit simultaneously to multiple UEs on SL.

Figure 16:
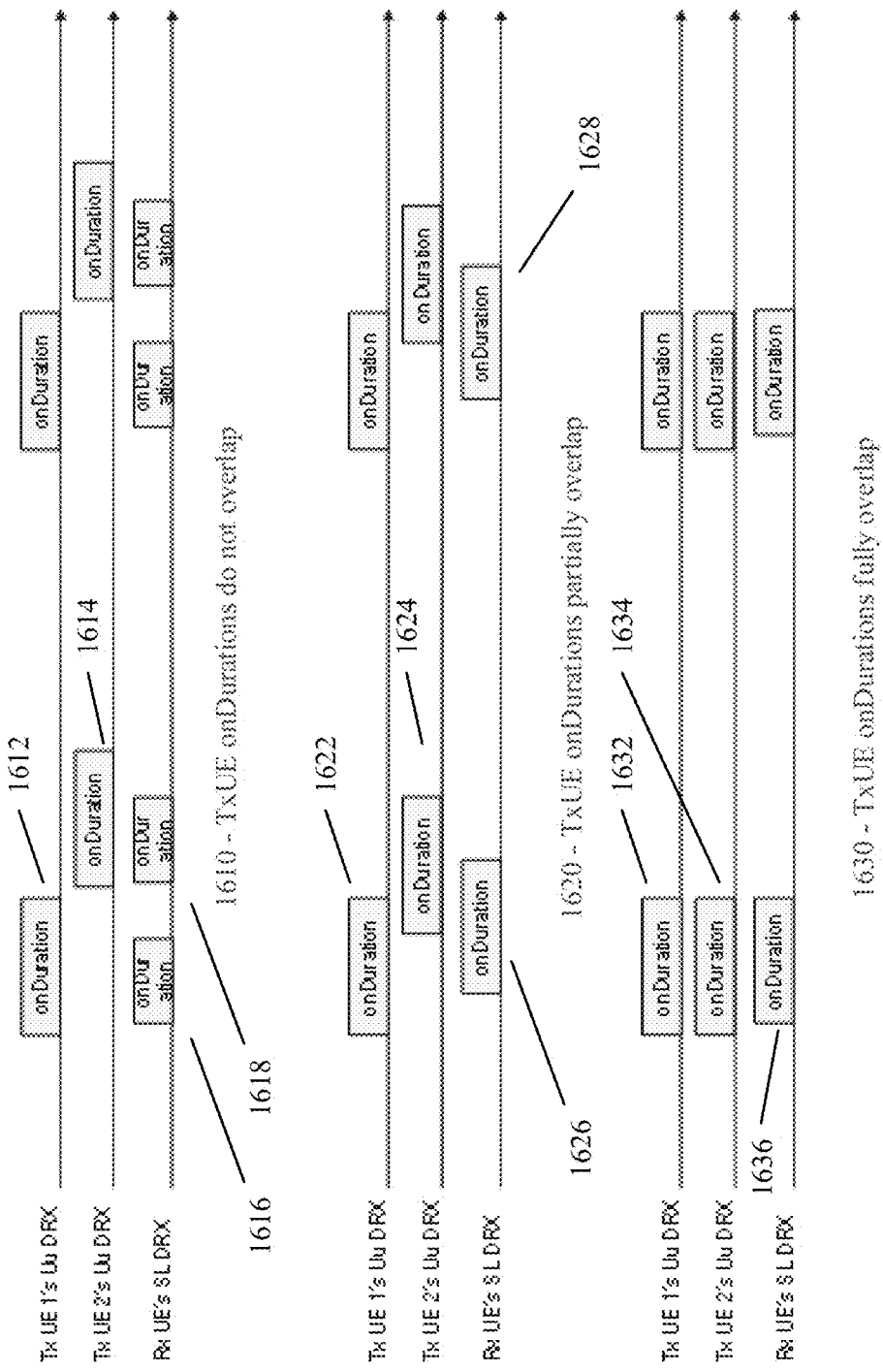
FIG. 16 illustrates alignment diagrams for multiple UEs in SL, in accordance with examples of the technology disclosed herein.

Next consider scenarios with one RxUE with Multiple TxUEs, as in in FIG. 16. In a first of such scenarios 1610, TxUE's onDurations (1612, 1614) do not overlap and RxUE's onDuration (1616, 1618) to different TxUEs do not overlap either. If the SL Rx UE doesn't have the capability to receive from multiple UEs on SL it would require DRX configuration. In second of such scenarios, TxUE's onDurations (1622, 1624) on Uu links and RxUE's onDuration 1626 partially overlap. This scenario would not pose interruptions/missed data for the RxUE when receiving from multiple TX UEs if the RxUE has the capability to receive from multiple UEs on SL. In third of such scenarios, TxUE's onDurations (1632, 1634) on Uulinks and RxUE's onDuration 1636 fully overlap. Again, this third scenario would not pose interruptions/missed data for the RxUE when receiving from multiple TX UEs if the RxUE has the capability to receive from multiple UEs on SL.

With regard to FIG. 16, to facilitate appropriate overlap/non-overlap of the onDurations on Uu and SL in case of multiple unicasts for an TxUE or for an RxUE, RxUEs capability for simultaneously receiving from multiple UEs on SL needs to be considered. RxUE's capability for simultaneously receiving from multiple TxUEs also can be indicated to TxUE's gNB to assist the gNB in determining appropriate RxUE's DRX configuration. To facilitate appropriate overlap/non-overlap of the onDurations on Uu/SL in case of multiple RxUEs, signaling of TxUEs capability to simultaneously transmit to multiple UEs on SL is desirable. Some aspects of the technology disclosed herein define TxUE's capability to simultaneously transmit to multiple RxUEs to assist the gNB in determining appropriate RxUE's SL DRX configuration and TxUE's Uu DRX configuration.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one \of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A wireless communication method, comprising:
   for each of one or more first UEs (TxUEs) i) in a first discontinuous reception (DRX) mode in sidelink (SL) with each of one or more second UEs (RxUEs), and ii) in a second DRX mode over an air interface (Uu) with a corresponding a next-generation NodeB or giga-NodeB (gNB), determining:
      a TxUE Uu active time, and
      a TxUE Uu offset time accounting for processing, by the TxUE, of both i) an SL resource grant of the TxUE from the gNB over Uu and ii) data for transmission to each RxUE over the granted SL resources, the TxUE Uu offset time greater than or equal to a minimum TxUE Uu offset time of the TxUE; and
   second determining, for each RxUE, one or more RxUE SL active times, each RxUE SL active time:
      starting no earlier than a start of the TxUE Uu active time plus the TxUE Uu offset time for a TxUE from which the each RxUE is to receive data, and
      ending no later than an end of the TxUE Uu active time for a TxUE from which the each RxUE is to receive data over SL.

2. The method of claim 1, further comprising:
   transmitting, by each TxUE to each corresponding one or more RxUEs via SL, each RxUE SL active time; and
   communicating, via SL, from each TxUE to each corresponding RxUE in accordance with the TxUE Uu active time and the transmitted RxUE SL active times.

3. The method of claim 1, wherein:
   each TxUE Uu active time comprises a TxUE Uu active time start and a TxUE Uu active time duration (TxUE onDuration);
   each RxUE SL active time comprises an RxUE active time start and RxUE active time duration (RxUE onDuration); and
   each RxUE onDuration is a function of one or more of: path loss in SL between the each RxUE and the corresponding TxUE; a traffic pattern between the each RxUE and the corresponding TxUE in SL; a number of RxUEs connected in SL to the corresponding TxUE; and a quality of service required between the each RxUE and the corresponding TxUE in SL.

4. The method of claim 3, wherein:
   each determining is performed in the gNB corresponding to the corresponding TxUE; and
   the method further comprises receiving, prior to each determining, from the corresponding TxUE by the corresponding gNB at least one selected from the group consisting of i) the path loss in SL between each RxUE and the corresponding TxUE, and ii) the traffic pattern as list of {periodicity, packet size} for each of one or more data flows.

5. The method of claim 3, wherein:
   a particular TxUE of the one or more TxUEs is not capable of communicating in SL with a plurality of RxUEs having overlapping RxUE SL active times; and
   determining, for each RxUE, one or more RxUE SL active times corresponding to the particular TxUE further comprises determining one or more RxUE SL active times that do not overlap with active times of another RxUE in SL communication with the particular TxUE.

6. The method of claim 3, wherein:
   a particular RxUE of the one or more RxUEs is not capable of receiving signals from multiple TxUEs at a same time; and
   determining a TxUE active time comprises determining a TxUE active time that does not overlap with an active time of another TxUE in SL communication with the particular RxUE.

7. The method of claim 3, further comprising:
second receiving, from each RxUE by the corresponding TxUE and prior to determining one or more RxUE SL active times, an indication of an ability of the each RxUE to monitor signals from multiple UEs (numTxUEsmonitor), and wherein RxUE onDuration further comprises a function of the received indication of an ability of the each RxUE to monitor signals from multiple UEs (numTxUEsmonitor).

8. The method of claim 7, wherein:
each determining is performed in the gNB corresponding to the corresponding TxUE; and
the method further comprises third receiving, from the corresponding TxUE by the corresponding gNB the transmitted indication of an ability of the each RxUE to monitor signals from multiple UEs (numTxUEsmonitor) as part of a SidelinkURInformationNR message prior to determining a TxUE active time.

9. The method of claim 3, wherein:
a particular TxUE of the one or more TxUEs is capable of communicating in SL with a plurality of RxUEs having overlapping RxUE SL active times, and each determining is performed in the gNB corresponding to the TxUE;
the method further comprising, fourth receiving, from the TxUE to the corresponding gNB and prior to the determining one or more the RxUE SL active times, an indication of capability of the particular TxUE of communicating in SL with a plurality of RxUEs having overlapping RxUE SL active times (fastBeamSwitch); and
determining, for each RxUE, one or more RxUE SL active times corresponding to the particular TxUE further comprises determining one or more RxUE SL active times that overlap with active times of another RxUE in SL communication with the particular TxUE only if fastBeamSwitch is indicated for the particular TxUE.

10. The method of claim 9, wherein the fourth receiving comprises fourth receiving the fastBeamSwitch using a Radio Resource Control (RRC) information element (IE) UE-NR-Capability as a physical parameter specific to Frequency Range 2 (FR2).

11. The method of claim 1 wherein:
each determining is performed in the gNB corresponding to the TxUE; and
the method further comprises fifth receiving, from the TxUE by the corresponding gNB
and prior to the determining one or more the RxUE SL active times, the minimum TxUE Uuoffset time (onDuration-Offset) of the TxUE.

12. The method of claim 11, wherein the fifth receiving comprises fifth receiving the onDuration-Offset using a Radio Resource Control (RRC) information element (IE) UE-NR-Capability as a physical parameter common to Frequency Range 1 (FR1) and Frequency Range2 (FR2).

13. An apparatus for wireless communication, comprising:
a memory; and
at least one processor coupled to the memory, the memory including instructions executable by the at least one processor to cause the apparatus to:
for each of one or more first UEs (TxUEs) i) in a first discontinuous reception (DRX) mode in sidelink (SL) with each of one or more second UEs (RxUEs), and ii) in a second DRX mode over an air interface (Uu) with a corresponding a next-generation NodeB or giga-NodeB (gNB), determine:
an TxUE Uu active time, and
a TxUE Uu offset time accounting for processing, by the TxUE, of both i) an SL resource grant of the TxUE from the gNB over Uu and ii) data for transmission to each RxUE over the granted SL resources, the TxUE Uu offset time greater than or equal to a minimum TxUE Uu offset time of the TxUE; and
second determine, for each RxUE, one or more RxUE SL active times, each RxUE SL active time:
starting no earlier than a start of the TxUE Uu active time plus the TxUE Uu offset time for a TxUE from which the each RxUE is to receive data, and
ending no later than an end of the TxUE Uu active time for a TxUE from which the each RxUE is to receive data over SL.

14. The apparatus of claim 13, wherein the memory further includes instructions executable by the at least one processor to cause the apparatus to:
transmit, by each TxUE to each of the corresponding one or more RxUEs via SL, each RxUE SL active time; and
communicate, via SL, from each TxUE to each corresponding RxUE in accordance with the TxUE Uu active time and the transmitted RxUE SL active times.

15. The apparatus of claim 13, wherein:
each TxUE Uu active time comprises a TxUE Uu active time start and a TxUE Uu active time duration (TxUE onDuration);
each RxUE SL active time comprises an RxUE active time start and RxUE active time duration (RxUE onDuration); and
each RxUE onDuration is a function of one or more of: path loss in SL between the each RxUE and the corresponding TxUE; a traffic pattern between the each RxUE and the corresponding TxUE in SL; a number of RxUEs connected in SL to the corresponding TxUE; and a quality of service required between the each RxUE and the corresponding TxUE in SL.

16. The apparatus of claim 15, wherein:
a particular TxUE of the one or more TxUEs is not capable of communicating in SL with a plurality of RxUEs having overlapping RxUE SL active times; and
determining, for each RxUE, one or more RxUE SL active times corresponding to the particular TxUE further comprises determining one or more RxUE SL active times that do not overlap with active times of another RxUE in SL communication with the particular TxUE.

17. The apparatus of claim 15, wherein:
a particular RxUE of the one or more RxUEs is not capable of receiving signals from multiple TxUEs at a same time; and
determining a TxUE active time comprises determining a TxUE active time that does not overlap with an active time of another TxUE in SL communication with the particular RxUE.

18. The apparatus of claim 15, wherein the memory further includes instructions executable by the at least one processor to cause the apparatus to:
second receive, from each RxUE by the corresponding TxUE and prior to determining one or more RxUE SL active times, an indication of an ability of the each RxUE to monitor signals from multiple UEs (numTxUEsmonitor), and wherein RxUE onDuration further comprises a function of the received indication of an ability of the each RxUE to monitor signals from multiple UEs (numTxUEsmonitor).

19. A computer-readable medium storing processor-executable code, the code when read and executed by at least one processor of an apparatus, causes the apparatus to:
for each of one or more first UEs (TxUEs) i) in a first discontinuous reception (DRX) mode in sidelink (SL) with each of one or more second UEs (RxUEs), and ii) in a second DRX mode over an air interface (Uu) with a corresponding a next-generation NodeB or giga-NodeB (gNB), determine:
an TxUE Uu active time, and
a TxUE Uu offset time accounting for processing, by the TxUE, of both i) an SL resource grant of the TxUE from the gNB over Uu and ii) data for transmission to each RxUE over the granted SL resources, the TxUE Uu offset time greater than or equal to a minimum TxUE Uu offset time of the TxUE; and
second determine, for each RxUE, one or more RxUE SL active times, each RxUE SL active time:
starting no earlier than a start of the TxUE Uu active time plus the TxUE Uu offset time for a TxUE from which the each RxUE is to receive data, and
ending no later than an end of the TxUE Uu active time for a TxUE from which the each RxUE is to receive data over SL.

20. The computer-readable medium of claim 19, wherein the code when read and executed by at least one processor of an apparatus, further causes the apparatus to:
transmit, by each TxUE to each of the corresponding one or more RxUEs via SL, each RxUE SL active time; and
communicate, via SL, from each TxUE to each corresponding RxUE in accordance with the TxUE Uu active time and the transmitted RxUE SL active times.

21. The computer-readable medium of claim 19, wherein:
each TxUE Uu active time comprises a TxUE Uu active time start and a TxUE Uu active time duration (TxUE onDuration);
each RxUE SL active time comprises an RxUE active time start and RxUE active time duration (RxUE onDuration); and
each RxUE onDuration is a function of one or more of: path loss in SL between the each RxUE and the corresponding TxUE; a traffic pattern between the each RxUE and the corresponding TxUE in SL; a number of RxUEs connected in SL to the corresponding TxUE; and a quality of service required between the each RxUE and the corresponding TxUE in SL.

22. The computer-readable medium of claim 21, wherein:
a particular TxUE of the one or more TxUEs is not capable of communicating in SL with a plurality of RxUEs having overlapping RxUE SL active times; and
determining, for each RxUE, one or more RxUE SL active times corresponding to the particular TxUE further comprises determining one or more RxUE SL active times that do not overlap with active times of another RxUE in SL communication with the particular TxUE.

23. The computer-readable medium of claim 21, wherein:
a particular RxUE of the one or more RxUEs is not capable of receiving signals from multiple TxUEs at a same time; and
determining a TxUE active time comprises determining a TxUE active time that does not overlap with an active time of another TxUE in SL communication with the particular RxUE.

24. The computer-readable medium of claim 21, wherein the code when read and executed by at least one processor of an apparatus, further causes the apparatus to:
second receive, from each RxUE by the corresponding TxUE and prior to determining one or more RxUE SL active times, an indication of an ability of the each RxUE to monitor signals from multiple UEs (numTxUEsmonitor), and wherein RxUE onDuration further comprises a function of the received indication of an ability of the each RxUE to monitor signals from multiple UEs (numTxUEsmonitor).

25. An apparatus for wireless communications, comprising:
means for determining, for each of one or more first UEs (TxUEs) i) in a first discontinuous reception (DRX) mode over a sidelink (SL) air interface with each of one or more second UEs (RxUEs), and ii) in a second DRX mode over an air interface (Uu) with a corresponding a next-generation NodeB or giga-NodeB (gNB):
a TxUE Uu active time, and
a TxUE Uu offset time accounting for processing, by the TxUE, of both i) an SL resource grant of the TxUE from the gNB over Uu and ii) data for transmission to each RxUE over the granted SL resources, the TxUE Uu offset time greater than or equal to a minimum TxUE Uu offset time of the TxUE; and
means for second determining, for each RxUE, one or more RxUE SL active times, each RxUE SL active time:
starting no earlier than a start of the TxUE Uu active time plus the TxUE Uu offset time for a TxUE from which the each RxUE is to receive data, and
ending no later than the end of the TxUE Uu active time for a TxUE from which the each RxUE is to receive data.

26. The apparatus of claim 25, further comprising:
means for transmitting, by each TxUE to each of the corresponding one or more RxUEs via SL, each RxUE SL active time; and
means for communicating, via SL, from each TxUE to each corresponding RxUE in accordance with the TxUE Uu active time and the transmitted RxUE SL active times.

27. The apparatus of claim 25, wherein:
each TxUE Uu active time comprises a TxUE Uu active time start and a TxUE Uu active time duration (TxUE onDuration);
each RxUE SL active time comprises an RxUE active time start and RxUE active time duration (RxUE onDuration); and
each RxUE onDuration is a function of one or more of: path loss in SL between the each RxUE and the corresponding TxUE; a traffic pattern between the each RxUE and the corresponding TxUE in SL; a number of RxUEs connected in SL to the corresponding TxUE; and a quality of service required between the each RxUE and the corresponding TxUE in SL.

28. The apparatus of claim 27, wherein:
a particular TxUE of the one or more TxUEs is not capable of communicating in SL with a plurality of RxUEs having overlapping RxUE SL active times; and
means for determining, for each RxUE, one or more RxUE SL active times corresponding to the particular TxUE further comprises means for determining one or more RxUE SL active times that do not overlap with active times of another RxUE in SL communication with the particular TxUE.

29. The apparatus of claim 27, wherein:
a particular RxUE of the one or more RxUEs is not capable of receiving signals from multiple TxUEs at a same time; and
means for determining a TxUE active time comprises means for determining a TxUE active time that does not overlap with an active time of another TxUE in SL communication with the particular RxUE.

30. The apparatus of claim 27, further comprising:
means for second receiving, from each RxUE by the corresponding TxUE and prior to determining one or more RxUE SL active times, an indication of an ability of the each RxUE to monitor signals from multiple UEs (numTxUEsmonitor), and wherein RxUE onDuration further comprises a function of the received indication of an ability of the each RxUE to monitor signals from multiple UEs (numTxUEsmonitor).

\* \* \* \* \*